US011171449B2

(12) United States Patent
Hirose et al.

(10) Patent No.: US 11,171,449 B2
(45) Date of Patent: *Nov. 9, 2021

(54) CHARGER AND CHARGING SYSTEM

(71) Applicant: NINTENDO CO., LTD., Kyoto (JP)

(72) Inventors: Shinji Hirose, Kyoto (JP); Daisuke Kumazaki, Kyoto (JP); Takafumi Nishida, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,180

(22) Filed: Jan. 24, 2018

(65) Prior Publication Data
US 2018/0151982 A1    May 31, 2018

Related U.S. Application Data

(63) Continuation of application No. 15/299,791, filed on Oct. 21, 2016.

(30) Foreign Application Priority Data

Oct. 27, 2015 (JP) ................. 2015-210644

(51) Int. Cl.
*H01R 13/629* (2006.01)
*G06F 1/16* (2006.01)
(Continued)

(52) U.S. Cl.
CPC ........... *H01R 13/629* (2013.01); *A63F 13/90* (2014.09); *A63F 13/92* (2014.09); *A63F 13/98* (2014.09);
(Continued)

(58) Field of Classification Search
CPC .................................................. H02J 7/0044
See application file for complete search history.

(56) References Cited

U.S. PATENT DOCUMENTS 5,229,701 A * 7/1993 Leman .................. H02J 7/0045
320/115
5,939,859 A * 8/1999 Morita .................. H02J 7/0044
320/112
(Continued)

FOREIGN PATENT DOCUMENTS

EP    2 446 944 A1    5/2012
JP    11-024787 A     1/1999
(Continued)

OTHER PUBLICATIONS

Mar. 7, 2017 Extended European Search Report issued in European Application No. 16195234.6.

*Primary Examiner* — David V Henze-Gongola
(74) *Attorney, Agent, or Firm* — Nixon & Vanderhye P.C.

(57) ABSTRACT

A pedestal type device that functions as a non-limiting example charger comprises a connection portion that is constituted by a connection plug and a cover. The cover is supported so as to be movable up and down through a second hole of a placement portion. Furthermore, a convex portion that is protruded toward a front side is provided in a center of a lower end portion of a rear support portion. Two first projections are formed on an upper surface of the cover, and a first hole is formed between them. The connection plug is supported so as to be movable up and down through a third hole. If the convex portion is fitted into a first concave portion formed in a rear surface of electronic device when the electronic device is placed on the placement portion, the first projections are respectively fitted into two third concave portions formed on an undersurface of the electronic device, whereby the cover is pushed down. Therefore, the connection plug is inserted into the depths of a connector of the electronic device.

33 Claims, 9 Drawing Sheets

(51) Int. Cl.
*H02J 7/00* (2006.01)
*A63F 13/90* (2014.01)
*A63F 13/92* (2014.01)
*A63F 13/98* (2014.01)
*H04M 1/04* (2006.01)
*H01R 13/453* (2006.01)
*H01R 24/60* (2011.01)
*H01R 13/631* (2006.01)

(52) U.S. Cl.
CPC .............. *G06F 1/16* (2013.01); *G06F 1/1632* (2013.01); *H02J 7/0044* (2013.01); *H04M 1/04* (2013.01); *H01R 13/4538* (2013.01); *H01R 13/6315* (2013.01); *H01R 24/60* (2013.01)

(56) References Cited

U.S. PATENT DOCUMENTS

| | | | |
|---|---|---|---|
| 5,946,637 A * | 8/1999 | Umbach | H04M 19/08 |
| | | | 455/573 |
| 6,297,953 B1 | 10/2001 | Helot | |
| 6,366,458 B1 | 4/2002 | Yoshida et al. | |
| 9,568,949 B2 | 2/2017 | Shindo et al. | |
| 2009/0264008 A1 | 10/2009 | Matsuda et al. | |
| 2010/0265652 A1* | 10/2010 | Agata | G06F 1/1632 |
| | | | 361/679.41 |
| 2011/0190052 A1 | 8/2011 | Takeda et al. | |
| 2012/0025051 A1 | 2/2012 | Nishiyama et al. | |
| 2014/0120745 A1 | 5/2014 | Wang et al. | |
| 2014/0316310 A1* | 10/2014 | Ackermann | A61H 1/00 |
| | | | 601/46 |
| 2015/0277491 A1 | 10/2015 | Browning et al. | |
| 2015/0362953 A1* | 12/2015 | Shindo | H02J 7/0044 |
| | | | 361/679.41 |
| 2017/0117729 A1* | 4/2017 | Hirose | H01R 13/629 |

FOREIGN PATENT DOCUMENTS

| | | |
|---|---|---|
| JP | 11-353058 A | 12/1999 |
| JP | 2000-040534 A | 2/2000 |
| JP | 2003-61253 | 2/2003 |
| JP | 2003-118671 | 4/2003 |
| JP | 2005-129453 | 5/2005 |
| JP | 2005129453 A * | 5/2005 |
| JP | 2009-161008 | 7/2009 |
| JP | 2009-259682 | 11/2009 |
| JP | 2010-119273 A | 5/2010 |
| JP | 2012-032919 A | 2/2012 |
| JP | 2012-044783 A | 3/2012 |
| JP | 2012-249644 A | 12/2012 |
| JP | 2014-075327 | 4/2014 |
| JP | 2015-018316 A | 1/2015 |
| WO | WO 2014/125803 A1 | 8/2014 |
| WO | WO-2014125803 A1 * | 8/2014 ............ H02J 7/0044 |

* cited by examiner

FRONT SIDE

REAR SIDE

CHARGER AND CHARGING SYSTEM

CROSS REFERENCE OF RELATED APPLICATION

This application is a continuation of U.S. application Ser. No. 15/299,791, filed Oct. 21, 2016, and claims priority to Japanese patent application No. 2015-210644 filed on Oct. 27, 2015, the entire contents of each of which are incorporated herein by reference.

FIELD

This application describes a charger and a charge system, charging a battery of electronic device that is placed on a pedestal.

SUMMARY

It is a primary object of an embodiment(s) to provide a novel charger and charging system.

Furthermore, it is another object of the embodiment(s) to provide a charger and charging system, capable of easily placing electronic device in a correct position of a placement portion of the charger even if a connection portion is invisible.

Moreover, it is a further object of the embodiment(s) to provide a charger and charging system, capable of charging electronic device even if the electronic device has different size.

A first embodiment is a charger that charges an electronic device while placing the same on a placement portion. The charger comprises a second fitting portion, a fourth fitting portion and a second connection terminal. The second fitting portion is configured to be fitted to a first fitting portion on a first surface of the electronic device. For example, the second fitting portion is a convex portion or a concave portion. Therefore, the first fitting portion is a concave portion or a convex portion. The fourth fitting portion is configured to be fitted to a third fitting portion on a second surface of the electronic device is different from the first surface in a state where the first fitting portion is fitted to the second fitting portion. That is, when the first fitting portion and the second fitting portion are fitted to each other, the third fitting portion and the fourth fitting portion are fitted to each other in a state where the electronic device is positioned to the charger. For example, the fourth fitting portion is a convex portion or a concave portion. Therefore, the third fitting portion is a concave portion or a convex portion. The second connection terminal is configured to be electrically connected to a first connection terminal of the electronic device in conjunction with the fourth fitting portion.

According to the first embodiment, the third fitting portion and the fourth fitting portion are fitted to each other in a state where the first fitting portion and the second fitting portion are fitted to each other, and the second connection terminal is interlocked with this fourth fitting portion, whereby the first connection terminal and the second connection terminal can be electrically connected to each other. Accordingly, even if a connection portion is invisible, it is possible for a user to easily place the electronic device in a correct position of the placement portion by shifting a position of the electronic device to the charger.

A second embodiment is the charger according to the first embodiment, wherein the first surface intersects the second surface orthogonally or substantively orthogonally.

A third embodiment is the charger according to the first embodiment, wherein the second fitting portion functions as a first positioning member that determines a position of the electronic device to the placement portion, and the fourth fitting portion functions as a second positioning member that determines a position of the first connection terminal to the second connection terminal.

According to the third embodiment, since positioning is performed in two stages, it is possible to determine positions of the first connection terminal and the second connection terminal easily and precisely.

A fourth embodiment is the charger according to the first embodiment, wherein a fitting precision of the second fitting portion and the first fitting portion is lower than a fitting precision of the third fitting portion and the fourth fitting portion. Specifically, since the fourth fitting portion is fitted to the third fitting portion in a state where the first fitting portion and the second fitting portion are fitted to each other, the positions of the first connection terminal and the second connection terminal are roughly determined by the first positioning member, and the positions of the first connection terminal and the second connection terminal are finely determined by the second positioning member.

According to the fourth embodiment, since the positioning with low precision and the positioning with high precision are performed in this order, it is possible to determine positions of the first connection terminal and the second connection terminal easily and precisely.

A fifth embodiment is the charger according to the first embodiment, wherein the second fitting portion is in a position is configured to fit to the first fitting portion prior to the fourth fitting portion is fitted to the third fitting portion when placing the electronic device on the placement portion.

According to the fifth embodiment, it is possible to perform the positioning with low precision and the positioning with high precision in this order dependent on the position where the second fitting portion is.

A sixth embodiment is the charger according to the first embodiment, wherein the fourth fitting portion is movable in a direction perpendicular to a direction that the electronic device is placed on the placement portion.

According to the sixth embodiment, even if the electronic device is slightly shifted in the direction perpendicular to the direction to place on the placement portion, the fourth fitting portion is fitted to the third fitting portion, and therefore, the first connection terminal and the second connection terminal can be surely connected to each other.

A seventh embodiment is the charger according to the first embodiment, further comprising an elastic body that is disposed between the fourth fitting portion and a main body of the charger.

According to the seventh embodiment, the fourth fitting portion is movable in a direction that a shape of the elastic body is changed. Therefore, even if the position of the fourth fitting portion to the third fitting portion is slightly shifted, the fourth fitting portion can be fitted to the third fitting portion.

An eighth embodiment is the charger according to the first embodiment, wherein the second connection terminal is disposed between two fourth fitting portions.

According to the eighth embodiment, if two third fitting portions are provided correspondingly to the two fourth fitting portions, even if the electronics equipment is turned in a direction perpendicular to the direction that the electronics equipment is placed on the placement portion, it is possible to make the first connection terminal and the second connection terminal face each other when the third fitting portions and the fourth fitting portions are fitted to each other, respectively. Therefore, it is possible to surely connect the first connection terminal and the second connection terminal to each other.

A ninth embodiment is the charger according to the first embodiment, further comprising a movable member. The movable member surrounds at least the second connection terminal, and is configured to move in a first direction that the electronic device is placed on the placement portion. For example, prior to the first fitting portion and the second fitting portion are fitted to each other, the movable member covers except a tip end portion of the second connection terminal. Furthermore, the movable member is moved after the third fitting portion and the fourth fitting portion are fitted to each other, whereby the second connection terminal is exposed.

According to the ninth embodiment, since the second connection terminal is almost covered by the movable member when not using the second connection terminal, the second connection terminal can be protected so as not to receive an impact etc. Furthermore, when using the second connection terminal, the movable member is moved, whereby the second connection terminal can be exposed.

A tenth embodiment is the charger according to the ninth embodiment, wherein the fourth fitting portion is on a surface of the movable member.

According to the tenth embodiment, since the fourth fitting portion is on the surface of the movable member, if the movable member is moved, the fourth fitting portion is also moved. Therefore, the fourth fitting portion can be interlocked with the second connection terminal.

An eleventh embodiment is the charger according to the tenth embodiment, wherein the fourth fitting portion includes a projection having an inclined surface that is inclined to the first direction.

According to the eleventh embodiment, since the fourth fitting portion has the inclined surface that is inclined to the first direction, when fitting the fourth fitting portion to the third fitting portion, a displacement of the fourth fitting portion in a direction perpendicular to the first direction can be absorbed by the inclined surface.

A twelfth embodiment is the charger according to the tenth embodiment, wherein the fourth fitting portion includes a projection in a shape of cone or truncated cone.

According also to the twelfth embodiment, a displacement of the fourth fitting portion in a direction perpendicular to the first direction can be absorbed when fitting the fourth fitting portion to the third fitting portion.

A thirteenth embodiment is the charger according to the ninth embodiment, further comprising a first support member and a second support member. The first support member supports the second connection terminal movably in a second direction perpendicular to the first direction. The second support member is different from the first support member, and supports the movable member movably in at least the second direction. When the third fitting portion is fitted to the fourth fitting portion, the second connection terminal is moved in the second direction as the movable member is moved in the second direction.

According to the thirteenth embodiment, since the second connection terminal is moved in the second direction as the movable member is moved in the second direction when the third fitting portion is fitted to the fourth fitting portion, it is possible to move the second connection terminal that is surrounded by the movable member to a position opposing the first connection terminal.

A fourteenth embodiment is the charger according to the thirteenth embodiment, wherein each of the first support member and the second support member includes an elastic body.

According to the fourteenth embodiment, since the second connection terminal and the movable member are supported by the elastic bodies only, it is possible implement high-precision positioning with simple structure.

A fifteenth embodiment is a charger that charges an electronic device that has a first fitting portion and a first connection terminal, and is placed on a placement portion of the charger, comprising: a second fitting portion is configured to be fitted to the first fitting portion; a second connection terminal is configured to be electrically connected to the first connection terminal; and a movable member that is movable in a direction perpendicular to a direction that the electronic device is placed on the placement portion in conjunction with the second fitting portion, and surrounds of the second connection terminal.

According to the fifteenth embodiment, since the movable member is, when the first fitting portion and the second fitting portion are fitted to each other, the movable member is moved in conjunction with the second fitting portion, and the second connection terminal is also moved according to this, whereby a position gap of the second connection terminal from the first connection terminal can be absorbed.

A sixteenth embodiment is a charging system comprising an electronic device and a charger that charges the electronic device placed on a placement portion of a placement portion, wherein the electronic device comprises a first fitting portion on a first surface, a second fitting portion on a second surface that is different from the first surface, and a first connection terminal, and a charger comprises a third fitting portion is configured to be fitted to the first fitting portion, a fourth fitting portion is configured to be fitted to the second fitting portion in a state where the first fitting portion is fitted to the third fitting portion, and a second connection terminal is configured to be electrically connected to the first connection terminal of the electronic device in conjunction with the fourth fitting portion.

According also to the sixteenth embodiment, likewise the first embodiment, even if a connection portion is invisible, by shifting a position of the electronic device to the charger, the first fitting portion and the second fitting portion are made to be fitted to each other and thus the electronic device can be easily placed in a correct position of the placement portion in the charger.

The above described objects and other objects, features, aspects and advantages of the embodiments will become more apparent from the following detailed description when taken in conjunction with the accompanying drawings.

5B is a perspective view viewing a rear surface of the non-limiting example electronic device obliquely.

Figure 1:
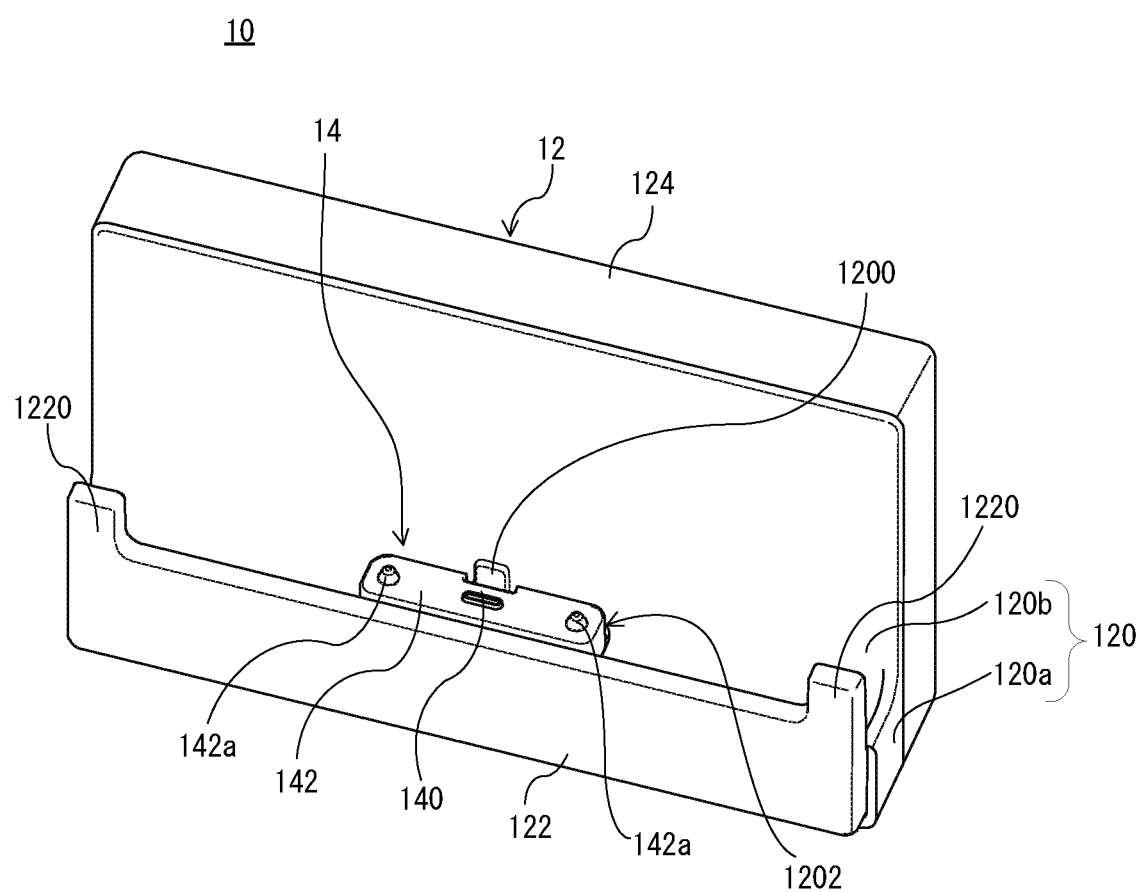
FIG. 1 is a perspective view showing a non-limiting example pedestal type device when viewing its front from obliquely above.
Figure 5A:
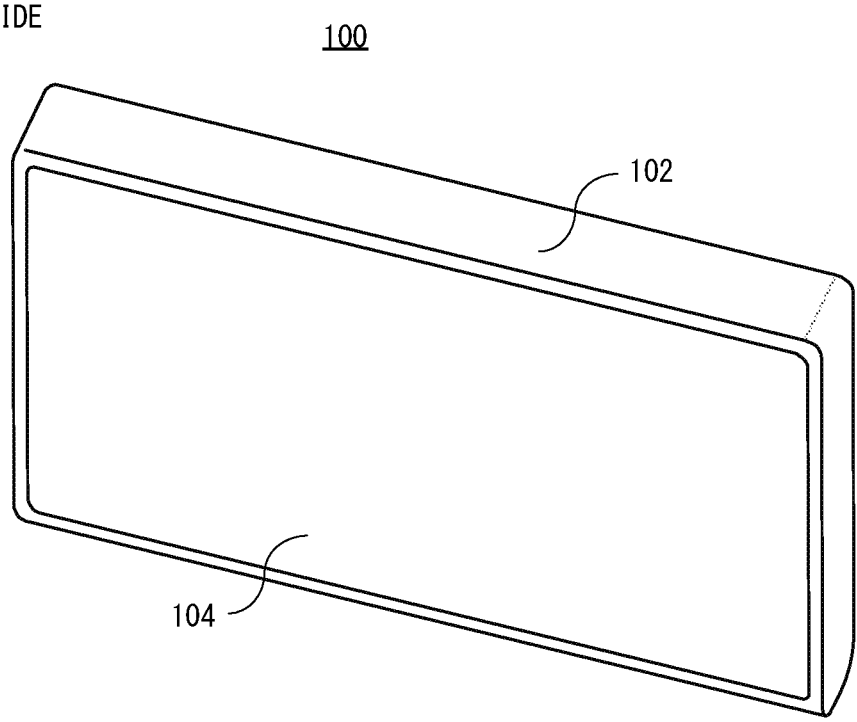
FIG. 5A is a perspective view viewing a front surface of non-limiting example electronic device obliquely, and FIG.
Figure 5B:
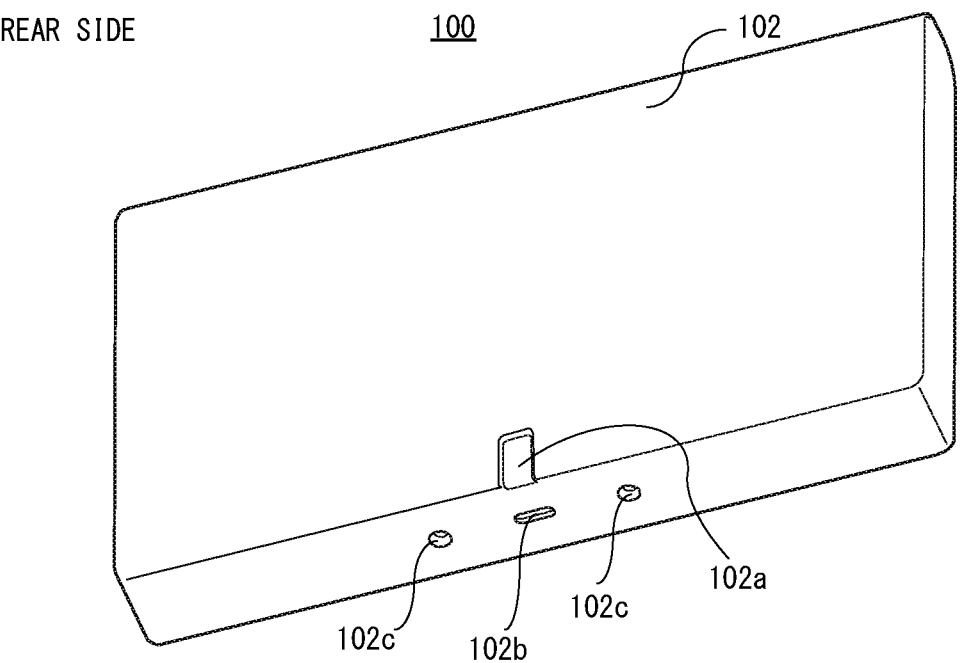
Figure 6:
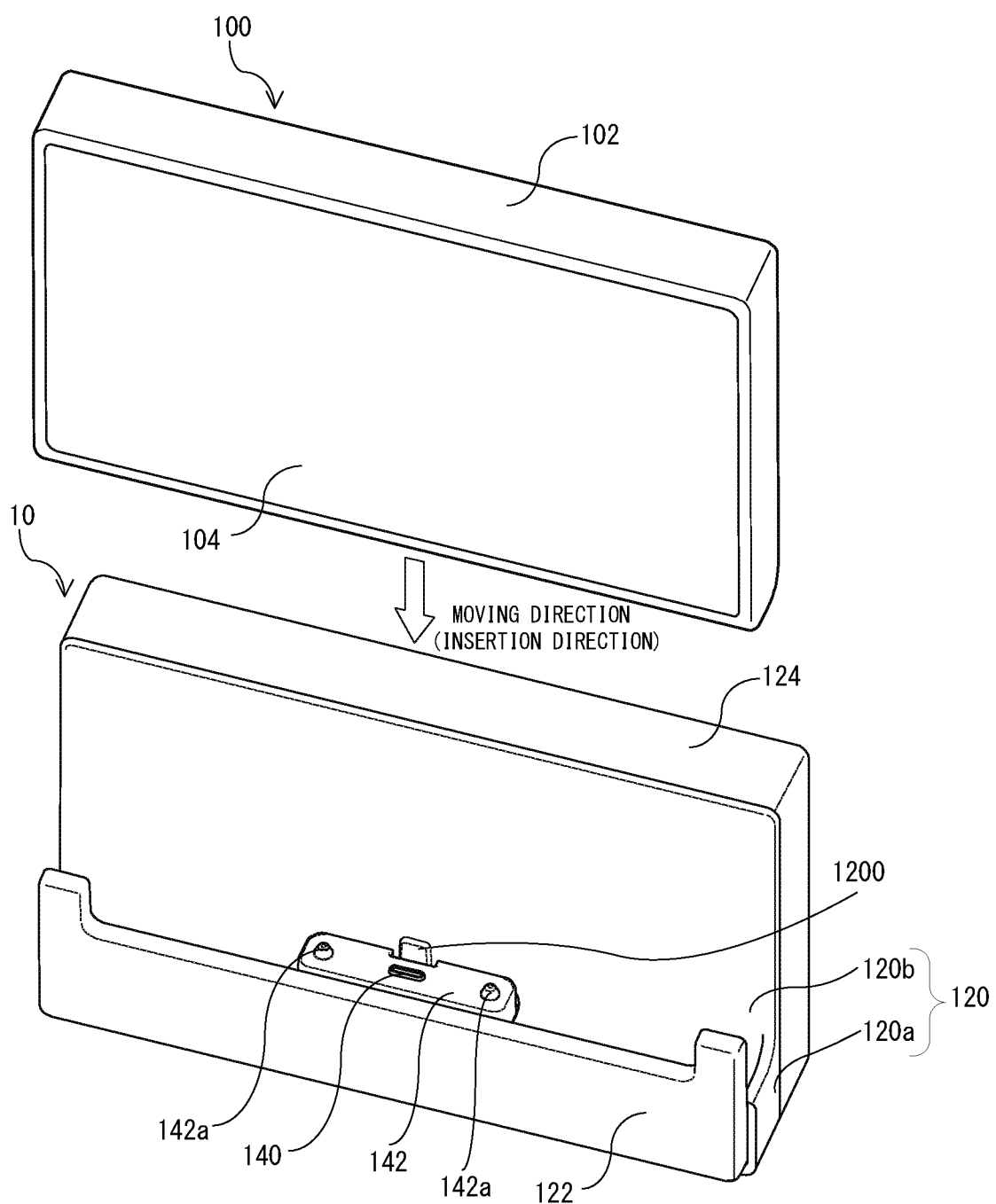

FIG. 6 is an illustration view showing a manner that the electronic device shown in FIG. 5 is placed on the pedestal type device shown in FIG. 1.

Figure 7A:
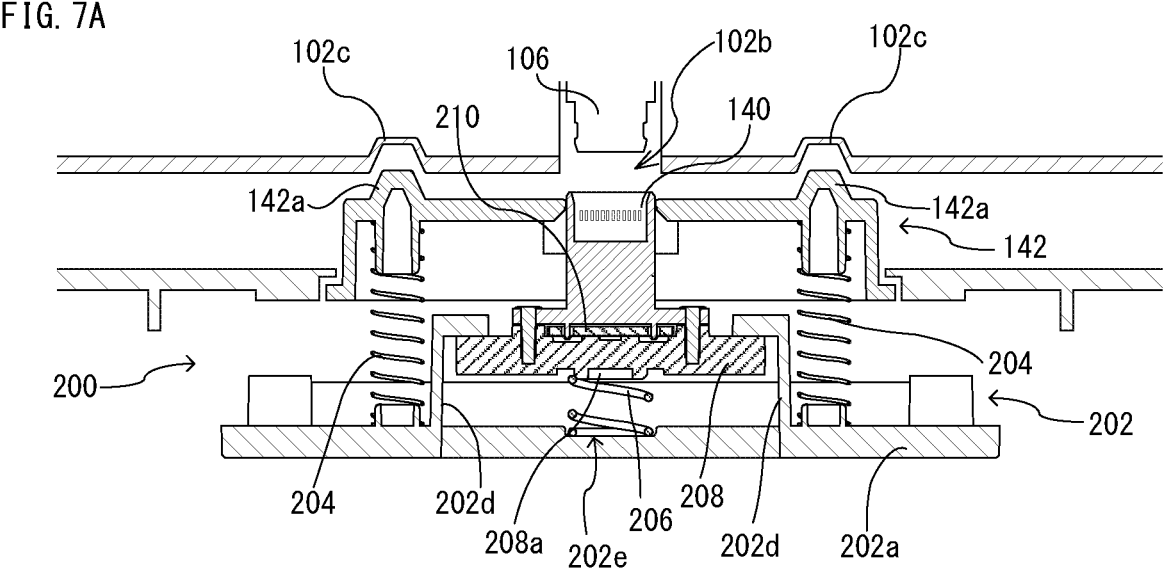
Figure 7B:
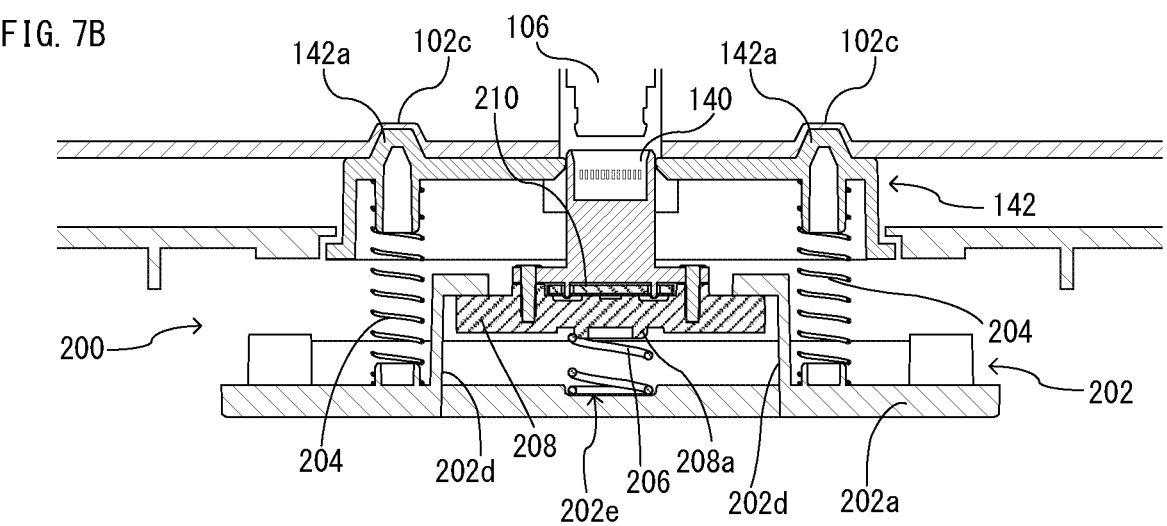
Figure 7C:
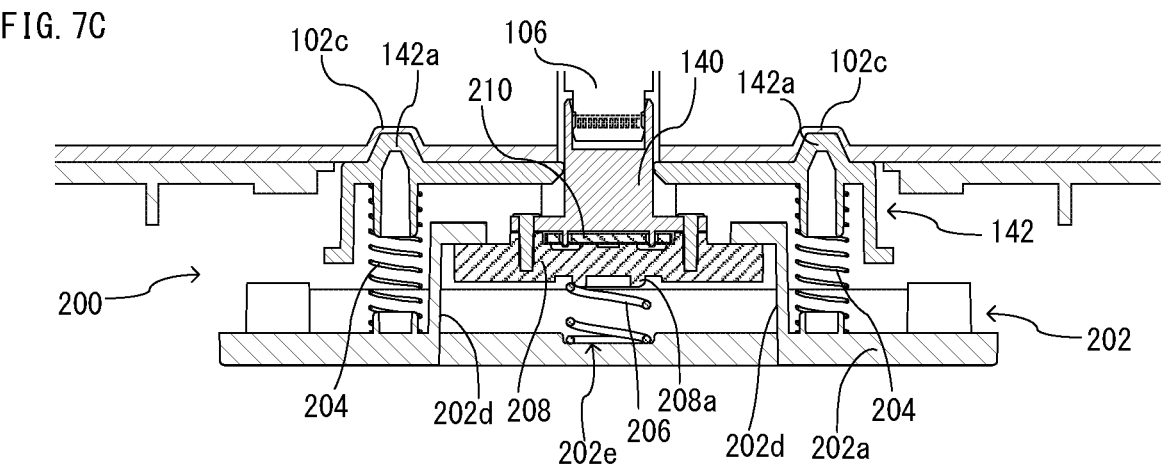

FIG. 7A is a sectional view showing a partial section of a state just before an undersurface of the electronic device is brought into contact with a cover when placing the electronic device shown in FIG. 5 on the pedestal type device shown in FIG. 1, FIG. 7B is a sectional view showing a partial section of a state where the undersurface of the electronic device is brought into contact with the cover when placing the electronic device shown in FIG. 5 on the pedestal type device shown in FIG. 1, and FIG. 7C is a sectional view showing a partial section of a state where the cover is pushed down by the undersurface of the electronic device when placing the electronic device shown in FIG. 5 on the pedestal type device shown in FIG. 1.

Figure 8:
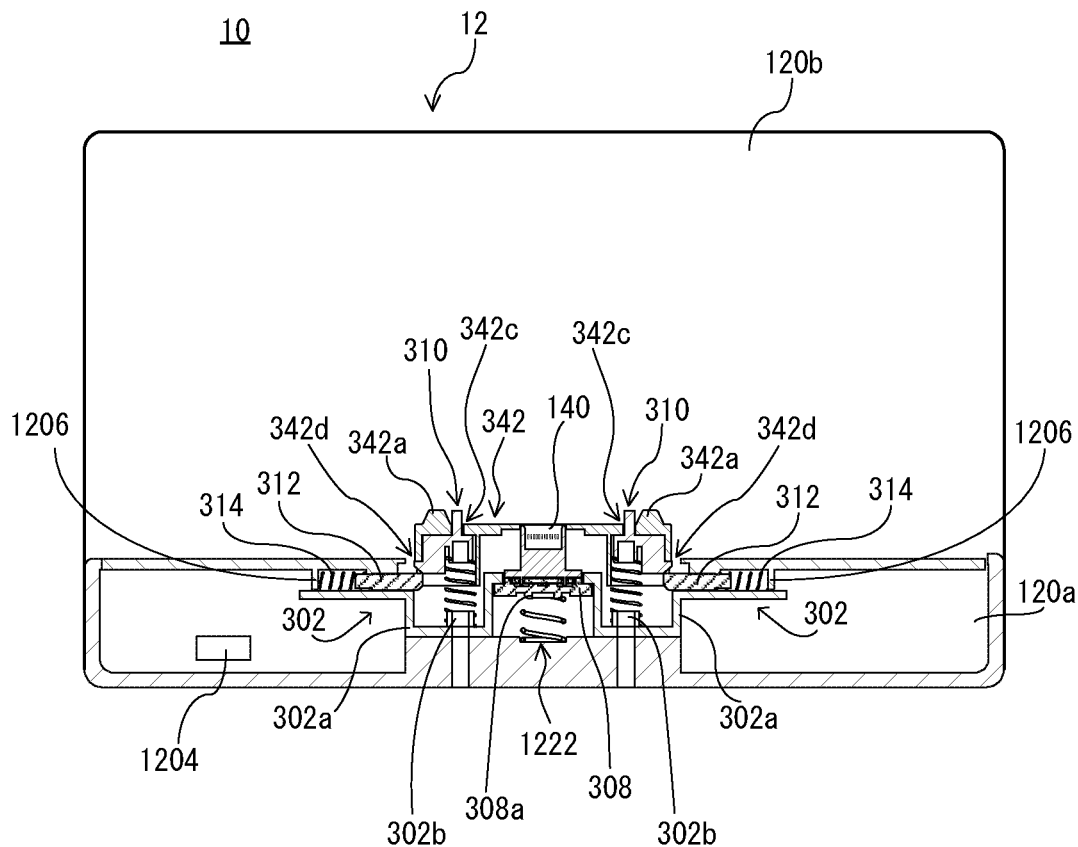

FIG. 8 is a sectional view showing another non-limiting example pedestal type device when viewing from its front.

Figure 9:
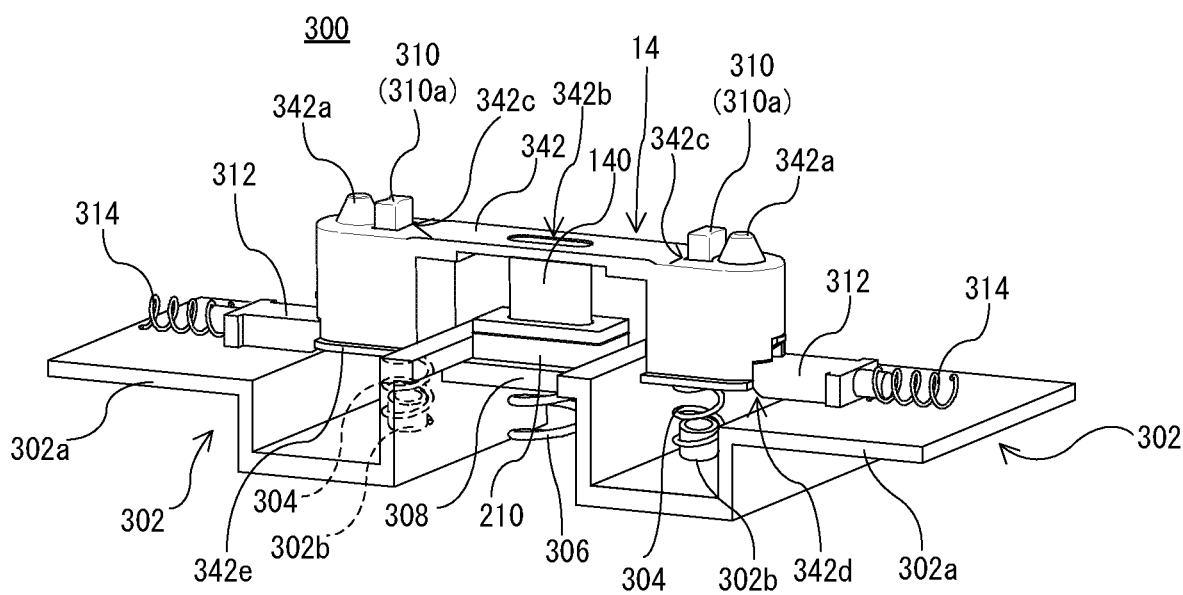

FIG. 9 is a perspective view showing non-limiting mounting structure of a connection portion of a second embodiment when being viewed from obliquely above.

Figure 10A:
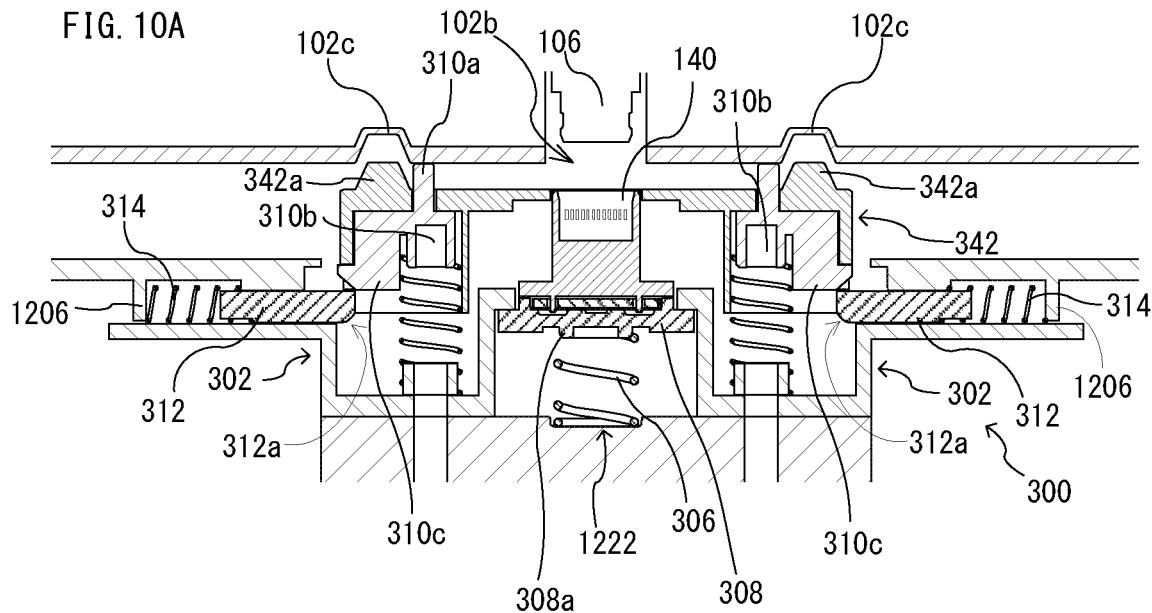
Figure 10B:
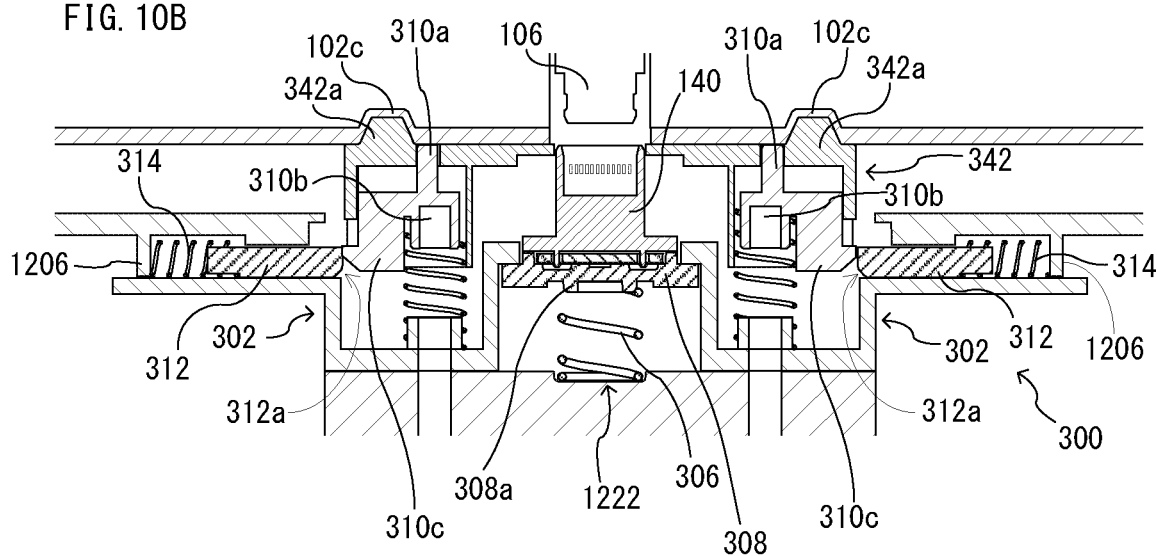
Figure 10C:
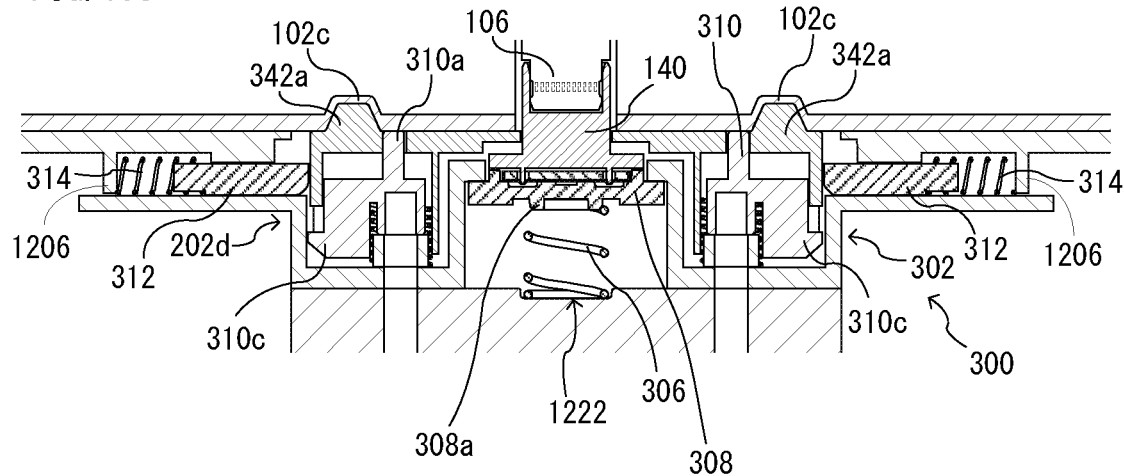

FIG. 10A is a sectional view showing a partial section of a state where an undersurface of electronic device is brought into contact with a depression portion of a first lock member when placing the electronic device shown in FIG. 5 on the pedestal type device of the second embodiment, FIG. 10B is a sectional view showing the partial section of a state where the undersurface of the electronic device is brought into contact with a cover when placing the electronic device shown in FIG. 5 on the pedestal type device of the second embodiment, and FIG. 10C is a sectional view showing a partial section of a state where the cover is pushed down by the undersurface of the electronic device when placing the electronic device shown in FIG. 5 on the pedestal type device.

Figure 11:
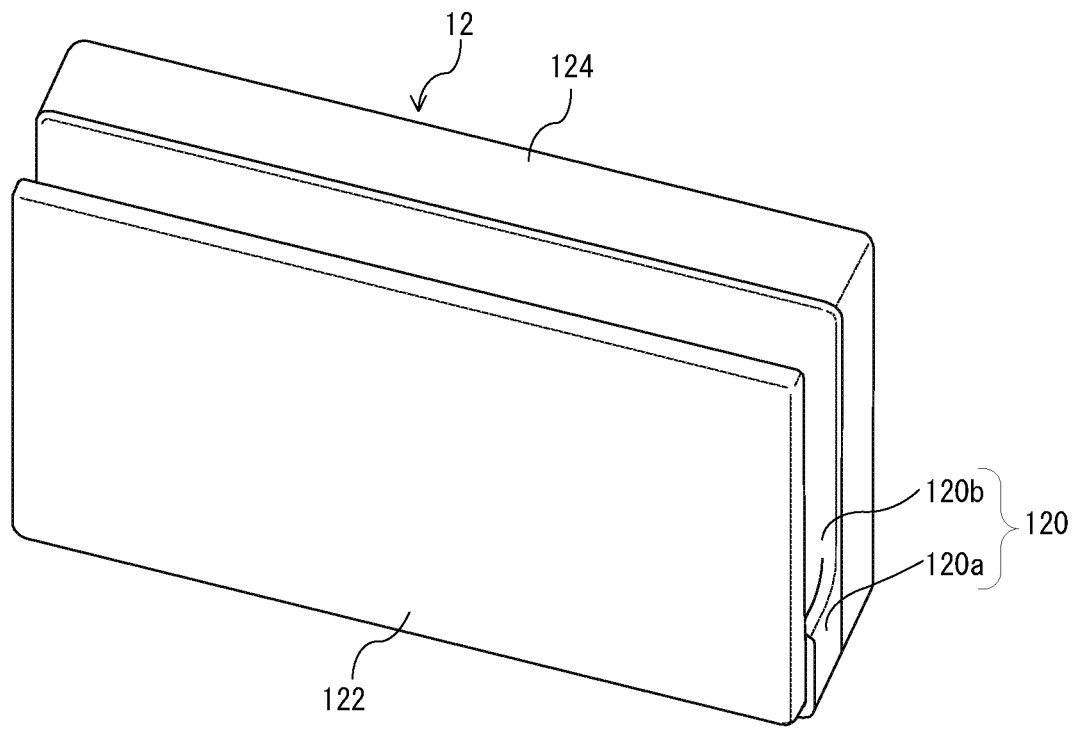

FIG. 11 is a perspective view showing a further non-limiting example pedestal type device when viewing its front from obliquely above.

DETAILED DESCRIPTION OF NON-LIMITING EXAMPLE EMBODIMENTS

First Embodiment

FIG. 1 is a perspective view viewing a front surface of a non-limiting example pedestal type device (cradle) 10 from obliquely above. Furthermore, FIG. 2A is a front view viewing the pedestal type device 10 from the front, and FIG. 2B is a right side view viewing the pedestal type device 10 from a right side surface.

Figure 2A:
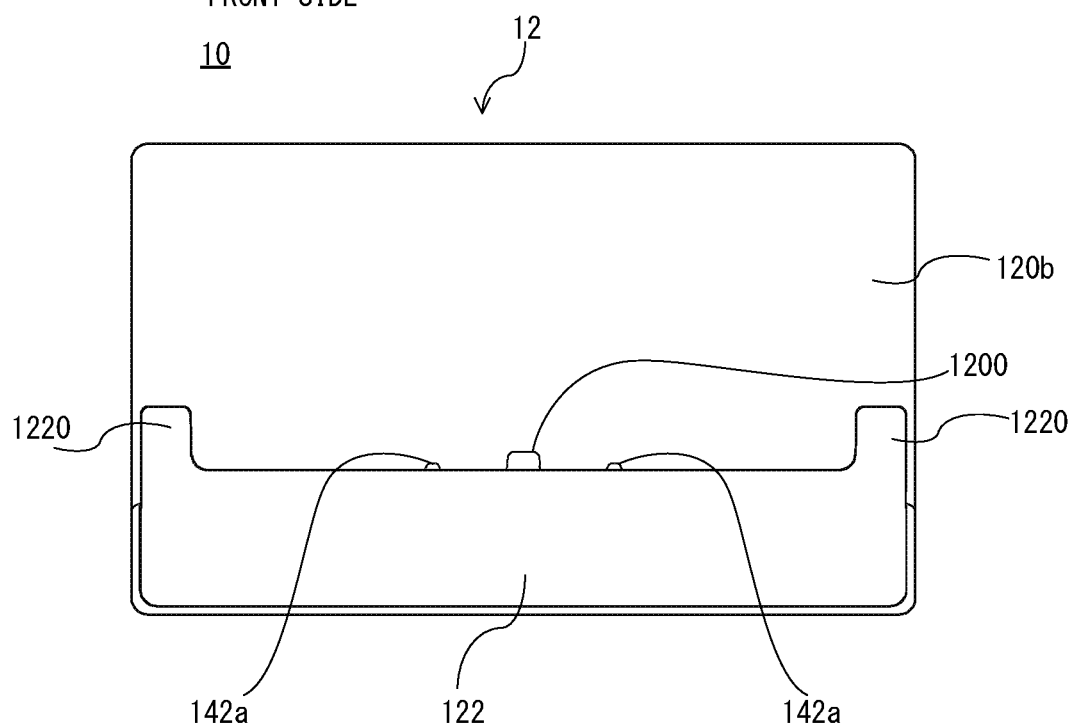
FIG. 2A is a front view of the pedestal type device shown in FIG. 1.
Figure 2B:
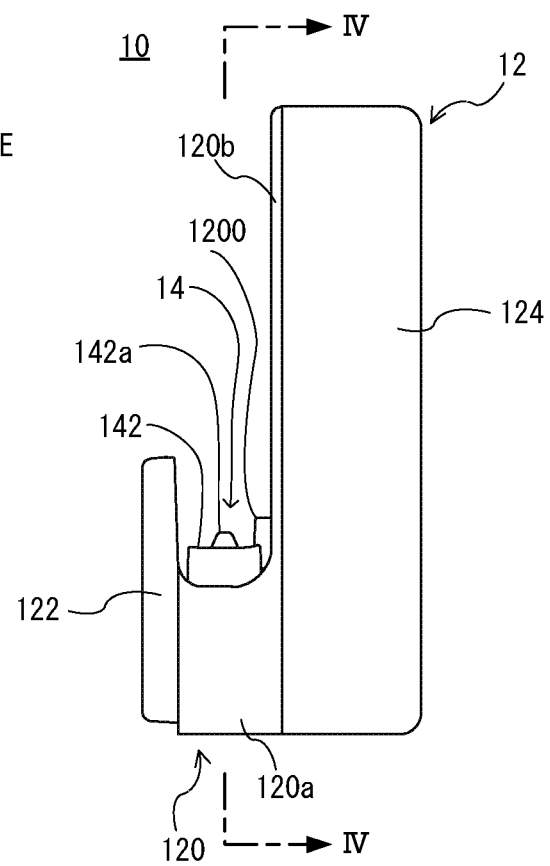
FIG. 2B is a right side view of the pedestal type device shown in FIG. 1.

With reference to FIG. 1, FIG. 2A and FIG. 2B, the pedestal type device 10 includes a main body 12 and a connection portion 14. As well shown in FIG. 2B, the main body 12 is formed in a J-letter shape when viewing from a right side surface, and constituted by a first pedestal member 120 that electronic device 100 (see FIG. 5A and FIG. 5B) is placed (attached) thereon and supports a rear surface of the electronic device 100, a front support member 122 that supports a part of the electronic device 100 from a front surface, and an accommodation member 124 that is provided in a rear side of the first pedestal member 120. For example, the main body 12 (the first pedestal member 120, the front support member 122 and the accommodation member 124) is formed by a synthetic resin such as a plastic.

The first pedestal member 120 includes a placement portion 120a and a rear support portion 120b, and the above-described connection portion 14 is provided on the placement portion 120a. The rear support portion 120b is formed in a plate shape, and provided integrally with the placement portion 120a so as to be extended upward from an upper surface of the placement portion 120a in a rear side of the placement portion 120a. A convex portion 1200 that is protruded toward a front side in a lower end portion of the front side is provided in this rear support portion 120b.

The front support member 122 is a plate-like member provided in the front side of the first pedestal member 120, and a part of an upper end portion is lacked. Therefore, the front support member 122 has, in both ends of a longitudinal direction, projection portions 1220 that are protruded upward.

The accommodation member 124 is a housing that accommodates various kinds of electronic components of the pedestal type device 10, and is formed in a rectangular parallelepiped shape that is opened in the front side of the pedestal type device 10. An opening of the accommodation member 124 (housing) is covered by a rear surface of the placement portion 120a and the rear support portion 120b.

Although illustration and detailed description are omitted, as the various kinds of electronic components, for example, a control circuit for performing overall control of the pedestal type device 10, a charging circuit for charging a battery of the electronic device 100 using a predetermined power supply such as commercial power, a communication circuit for performing a communication with the electronic device 100 and an AV (audio and visual (video)) circuit for outputting a video signal and an audio signal that are received from the electronic device 100 to an output device such as a television receiver, etc. correspond. That is, the pedestal type device 10 is a charger having a charging function, and, in this first embodiment, has not only the charging function but a communication function. However, the communication function may not be provided.

The connection portion 14 includes a male type connection terminal (connection plug) 140 to be connected to a female type connection terminal (connector) 106 of the electronic device 100, and a cover 142 surrounding this connection plug 140. As shown also in FIG. 2A and FIG. 2B, the connection portion 14 is provided on the main body 12 (placement portion 120a) in a center of the main body 12 (placement portion 120a) so that a part of the connection portion 14 is protruded from an upper surface of the placement portion 120a when the electronic device 100 is not placed.

Figure 3:
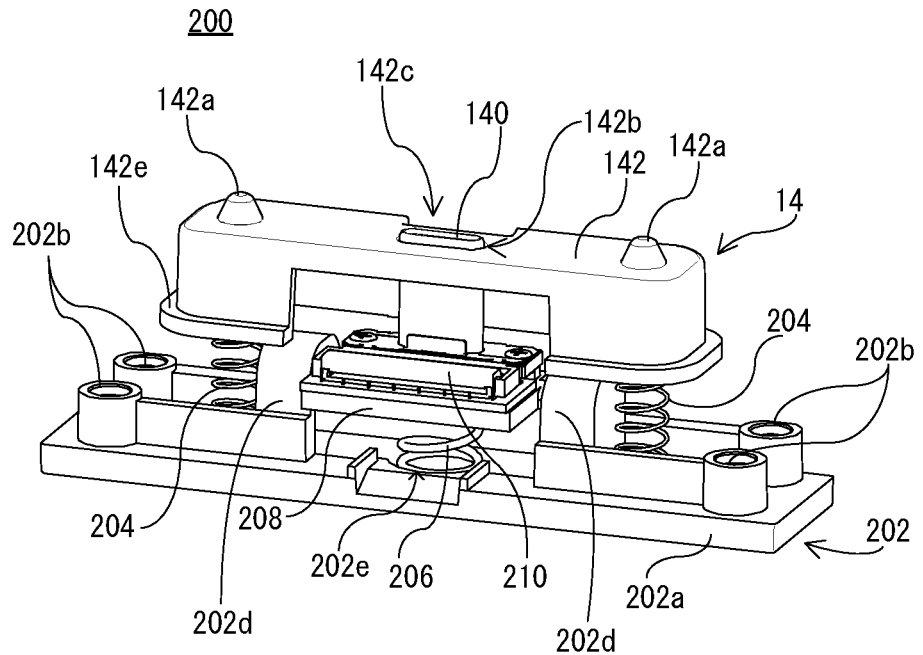
FIG. 3 is a perspective view showing non-limiting mounting structure of a connection portion shown in FIG. 1 when being viewed from obliquely above.
Figure 4:
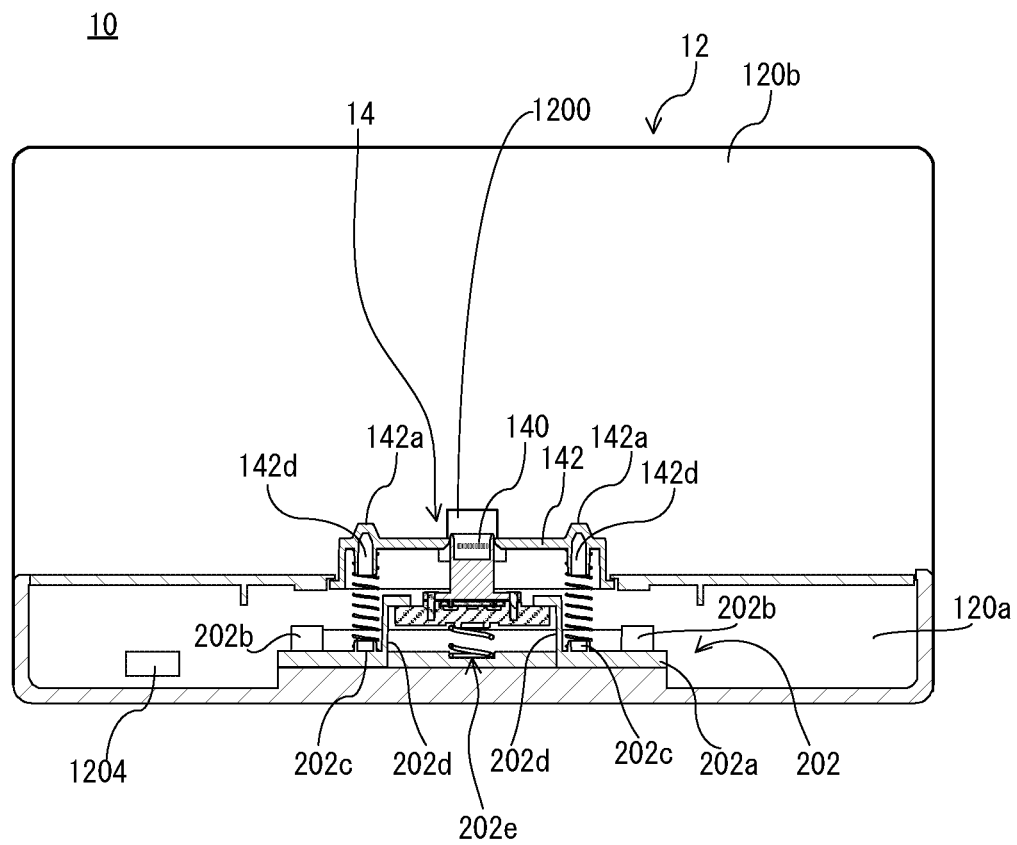
FIG. 4 is a sectional view at a line IV-IV in FIG. 2B.

FIG. 3 is a perspective view viewing the connection portion 14 and the front of mounting structure 200 of this connection portion 14 from obliquely above. FIG. 4 is a IV-IV sectional view in FIG. 2B.

As shown in FIG. 3, the mounting structure 200 includes a second pedestal member 202 that supports the connection portion 14, that is, the connection plug 140 and the cover 142. A support portion 202a of the second pedestal member 202 is provided with four cylinder members 202b in left and right end portions. These cylinder members 202b are provided in order to fix the second pedestal member 202 to the main body 12 (placement portion 120a) in an inside of the placement portion 120a. However, the second pedestal member 202 (mounting structure 200) is putted on a portion of a bottom of the placement portion 120a, which has a larger thickness compared with other portions.

Although illustration is omitted, a spiral thread is formed in an inside of each of the cylinder members 202b, and fixed with a screw from an undersurface of the placement portion 120a. However, since the support portion 202a is also penetrated in positions where the cylinder members 202b are provided, a hole of each of the cylinder members 202b is through to the undersurface of the second pedestal member 202. Furthermore, in the placement portion 120a, a bottom is penetrated in positions corresponding to the positions where the cylinder members 202b are provided.

In addition, although the second pedestal member 202 is fixed to a bottom of an inside of the support portion 202a, the second pedestal member 202 may be fixed in a ceiling side by providing a screw hole extended downward from the ceiling of the support portion 202a.

Furthermore, there are provided with two first attaching portions 202c on the support portion 202a. Each of the first attaching portions 202c is disposed in the circumference of the cylinder members 202b and near the center of the support portion 202a compared with the cylinder members 202b. A first spring 204 for supporting the cover 142 is attached on this first attaching portion 202c.

The cover 142 is formed in a shape of oblong dome, and provided with two first projections 142a in an upper surface thereof. For example, the cover 142 is formed, likewise the main body 12, by a synthetic resin such as a plastic. Furthermore, the two first projections 142a are provided in end portions of a longitudinal direction of the cover 142 with a predetermined interval. Although the first projection 142a is formed in a shape near truncated cone shape in this first embodiment, it may be formed in a shape of cone or a hemisphere shape. Furthermore, the first projection 142a may be formed in a shape of quadrangular pyramid trapezoid or quadrangular pyramid having inclined surfaces (tapered surfaces) in the front surface, rear surface, left side surface and right side surface of the pedestal type device 10. However, the first projection 142a may be formed in a shape of polygonal truncated pyramid or polygonal pyramid having a bottom surface of a triangle, a pentagon (regular pentagon), or more.

A first hole 142b that has a breadth extended in a longitudinal direction of the cover 142 is formed between the two first projections 142a and in a center of the cover 142. The connection plug 140 is disposed inside this first hole 142b. Furthermore, a notch 142c is provided in a center of the upper surface of the cover 142 and in a rear side of the first hole 142b. This notch 142c is provided in order to prevent the cover 142 from being brought into contact with the convex portion 1200.

Furthermore, two second attaching portions 142d are provided on a rear side surface (ceiling) of the upper surface of the cover 142. The second attaching portions 142d are disposed in positions on a straight line with the first projection 142a. The first springs 204 are respectively attached to these second attaching portions 142d. That is, one end of the first spring 204 is attached to the second attaching portion 142d, and as described above, the other end of the first spring 204 is attached to the first attaching portion 202c. Therefore, the cover 142 is supported from below with the first springs 204.

Furthermore, the cover 142 is provided with a second projection 142e in a lower end portion of side surface thereof, which is protruded outwardly of the cover 142 in a horizontal direction. That is, the second projection 142e is formed in a shape of track (oval) in top view. This second projection 142e is provided in order to regulate an upward movement of the cover 142 by engaging with the surface of the rear side (ceiling) of the upper surface of the placement portion 120a as shown in FIG. 4.

Furthermore, as described later, when placing the electronic device 100 in a correct position of the placement portion 120a, the cover 142 is pushed down so that the upper surface is located slightly above the upper surface of the placement portion 120a. That is, before the cover 142 is pushed down to the lowermost, the connection plug 140 is inserted to the depths of the connector 106 that is provided in the electronic device 100 (see FIG. 7C). This is for avoiding a poor connection caused by the connection plug 140 is not inserted to the depths of the connector 106 due to assembly errors, dimension errors of components, etc. Furthermore, even when the cover 142 is further pushed down in a state where the connection plug 140 is inserted to the depths of the connector 106, since the connection plug 140 is supported with a second spring 206 as described later, the connection plug 140 is movable downward. Therefore, it is possible to prevent the connection plug 140 and the connector 106 from being damaged. Thus, a height of the cover 142 is set up so that the connector 106 and the connection plug 140 can be connected (fitted) to each other correctly. Here, correct connection (fitting) means that electrodes of the connection plug 140 and electrodes of the connector 106 are brought into contact with each other with length of at shortest effective fitting length.

Furthermore, since a side surface of the cover 142 is brought into contact with an outer periphery of a second hole 1202 that is formed in the upper surface of the placement portion 120a, a movement in the horizontal direction of the cover 142 is regulated. That is, a movable range in the horizontal direction is determined by a gap between the second hole 1202 and the cover 142.

Thus, the cover 142 has a movable range that is determined by the first spring 204 and the second hole 1202 in an up-and-down direction, a front-rear direction and a left-right direction when viewing the pedestal type device 10 from the front.

Furthermore, the support portion 202a is provided with two accommodation portions 202d that accommodate (hold) a third pedestal member 208 movably in an up-and-down direction. The accommodation portions 202d are adjacent to the first attaching portions 202c, and are provided near a center in a longitudinal direction of the support portion 202a as compared with the first attaching portion 202c. The two accommodation portions 202d are disposed so that respective openings face each other, and accommodates stick-like support portions extended from both ends of the third pedestal member 208. Furthermore, as well shown also in FIG. 4, the accommodation portion 202d is formed in an L-letter shape in section.

Moreover, a first concave portion 202e is provided in a center of the support portion 202a. One end of the second spring 206 is inserted (held) into the first concave portion 202e. The other end of the second spring 206 is attached to a third attaching portion 208a (see FIG. 7A-FIG. 7C) that is provided on an undersurface of the third pedestal member 208. A circuit board 210 is attached to an upper surface of the third pedestal member 208. As described later, the connection plug 140 is mounted on an upper surface of this circuit board 210. Therefore, the circuit board 210 (connection plug 140) is supported movably at least in the up-and-down direction by the second spring 206. However, since the second spring 206 can be not only expanded/contracted but bent, the circuit board 210 can be moved in the horizontal direction.

The connection plug 140 is mounted on the circuit board 210. As shown also in FIG. 3, the connection plug 140 is electrically connected to the circuit board 210 so that a connection/disconnection direction of the connection plug 140 intersects perpendicular to the surface of the circuit board 210. One end of a signal cable not shown is connected to the circuit board 210. The signal cable is extended into an inside of the accommodation member 124 through a third hole 1204 that communicates the placement portion 120a and the accommodation member 124 with each other. Then, the other end of the signal cable is electrically connected to electronic components (control circuit) accommodated in the accommodation member 124.

The connection plug 140 is a plug of USB Type-C, for example. Therefore, this connection plug 140 is provided with two systems of signal lines for USB 3.0 or more and a system of signal line for USB 2.0. Furthermore, in an operation mode called an alternate mode, it is possible to transmit data of other formats such as Thunderbolt (registered trademark) 3, DisplayPort, MHL (Mobile High-definition Link), etc. while changing with USB. However, a kind (standard or format) of the connection plug 140 can be changed suitably according to a kind of the connector 106 (see FIG. 7A-FIG. 7C) that is provided in the electronic device 100 and a format of data communication.

As described above, the third pedestal member 208 is supported with the second spring 206, and the support portions of the both ends are accommodated in the accommodation portions 202d. Accordingly, the circuit board 210 is movable up and down between the two accommodation portions 202d. However, since upper end portions of the accommodation portions 202d are not opened, the third pedestal member 208 is regulated in a movement upward with being engaged by the upper end portion of the accommodation portions 202d. Therefore, upward movements of the circuit board 210 and the connection plug 140 that is mounted on the circuit board 210 are also regulated by the upper end portions of the accommodation portions 202d.

Furthermore, the third pedestal member 208 is regulated a movement in also the horizontal direction by the accommodation portions 202d. That is, a movable range of the third pedestal member 208 in the horizontal direction is determined by a gap between the accommodation portion 202d and the third pedestal member 208. However, a movable range of the third pedestal member 208 in a front-rear direction is determined by a gap between the accommodation portions 202d and the support portion of the third pedestal member 208. These are the same also about a movable range of the circuit board 210 and the connection plug 140 in the horizontal direction. However, since the connection plug 140 is disposed inside the first hole 142b that is provided in the upper surface of the cover 142, it is moved in the horizontal direction following a horizontal movement of the cover 142.

FIG. 5A is a perspective view viewing the front of an appearance configuration of the electronic device 100 of this first embodiment from obliquely above. FIG. 5B is a perspective view viewing the rear of the appearance configuration of the electronic device 100 of this first embodiment from obliquely below.

The electronic device 100 is an information processing apparatus or information processing terminal such as an electronic notebook, an electronic dictionary, a portable music player, a tablet PC, a feature phone, a smartphone, a game machine, a digital camera, etc., for example. The electronic device 100 is provided with a display 104 such as an LCD at the front of a housing 102 that is formed in a shape of rectangular parallelepiped. However, as the display 104, in place of the LCD, an EL (Electronic Luminescence) display and a plasma display may be used. Furthermore, a touch panel is provided on an upper surface of the display 104. However, in place of the display 104, a touch display that the display 104 and a touch panel are integrally formed may be provided.

In addition, although illustration is omitted, the electronic device 100 is provided with hardware keys such as a power button, a menu button, etc. in a portion where the display 104 is not provided on the housing 102 thereof.

Furthermore, the housing 102 of the electronic device 100 does not need to be limited to a shape of rectangular parallelepiped. For example, surfaces constituting the housing 102 do not need to be orthogonal to each other, and a part of the surfaces may be slightly shifted from the right angle for an adjacent surface. Furthermore, each side surface of the housing 102 of the electronic device 100 may not be a flat surface, may be formed with a curved surface that is curved outwardly. Furthermore, joining portions that respective surfaces of the housing 102 of the electronic device 100 are joined to each other may be made into a rounded shape (R form).

For example, the electronic device 100 has a size at the time of being viewed from the front, which is the same or almost the same as a size of the rear support portion 120b at the time of viewing the pedestal type device 10 from the front. Furthermore, a thickness (length in a depth direction) of the electronic device 100 is the same or almost the same length as a distance between the front support member 122 and the rear support portion 120b. However, this is an example and should not be limited.

Although detailed description is omitted, in such the electronic device 100, equipment dedicated applications or arbitrary applications can be performed, icons or/and buttons are displayed on the display 104, for example. A user advances a processing of the application by performing a touch operation to an icon or/and a button. Furthermore, an execution screen of the application is also displayed on the display 104. Furthermore, a sound (music) accompanying the execution of the application is output from a speaker not shown. However, a sound may not be output.

Furthermore, although illustration is omitted, the electronic device 100 can be operated with using an operation input device while connecting the operation input device of hardware to the electronic device 100. In FIG. 5A and FIG. 5B, connection terminal (connector) etc. for connecting the operation input device are also omitted. However, the above-described hardware keys may be used.

As shown in FIG. 5B, a second concave portion 102a is provided in the rear surface of the housing 102 of the electronic device 100 in a center of a lower end portion. The second concave portion 102a is opened in the undersurface side of the housing 102 while concaved toward an inside of the housing 102.

A breadth (width in the longitudinal direction of the electronic device 100) of the second concave portion 102a is set slightly larger than a breadth (width in the longitudinal direction of the pedestal type device 10) of the convex portion 1200. A difference (absolute value) between the breadth of this second concave portion 102a and the breadth of the convex portion 1200 is set larger than a difference (absolute value) between a diameter of a bottom of the first projection 142a and a diameter of an opening of a third concave portion 102c (see FIG. 7A-FIG. 7C) to which this first projection 142a is fitted. However, an opening portion of the third concave portion 102c is equivalent to a bottom of a truncated cone that is a shape of this third concave portion 102c. Furthermore, the diameter of the opening of the third concave portion 102c is larger than the diameter of the bottom of the first projection 142a.

Furthermore, in the second concave portion 102a, a width of a portion that is opened in an undersurface side may be set larger than a width of the convex portion 1200, and a width of a portion except the opened portion may be set equal to the width of the convex portion 1200. If doing in this way, it is easy to introduce the convex portion 1200 into the second concave portion 102a.

A longitudinal length of the second concave portion 102a (length of a short-sided direction of the electronic device 100) is set to a length that the undersurface of the electronic device 100 is brought into contact with the upper surface of the placement portion 120a in a state where the convex portion 1200 is fitted to the second concave portion 102a.

Furthermore, a hole 102b is formed in the undersurface of the housing 102 in the center. The connector 106 (see FIG. 7A-FIG. 7C) to which the connection plug 140 is connectable is provided in the inside of the housing 102 in a position where the hole 102b is formed. Although detailed description and illustration are omitted, the connector 106 is provided in the inside of the electronic device 100, is mounted on a circuit board on which various electronic components, such a processor, a memory, etc. are mounted, and is electrically connected to such the processor, etc. In addition, the electronic components to be mounted differ according to a function or/and use of the electronic device 100.

Furthermore, the two third concave portions 102c are provided so as to sandwich the hole 102b. Each of the two third concave portions 102c is a concave portion (hole) having a shape the same or approximately the same as a shape of the first projection 142a that is formed in the upper surface of the cover 142 (see FIG. 7A-FIG. 7C). That is, the two third concave portions 102c are provided in the undersurface orthogonally (it is not necessary to be 90 degrees strictly) intersecting a rear surface that the second concave portion 102a is provided. Therefore, when the electronic device 100 is placed on a correct position of the placement portion 120a of the pedestal type device 10, the first projection 142a is fitted to the third concave portion 102c.

A reason why the two first projections 142a and the two third concave portions 102c are thus provided, respectively is not only for positioning the connection plug 140 and the connector 106 so as to be aligned on a straight line but for making a tip end surface of the connection plug 140 and a tip end portion of the connector 106 face each other even if the electronic device 100 is turned in the horizontal direction, at the time of placing the electronic device 100 on the placement portion 120a of the pedestal type device 10 as described later. Therefore, the first projection 142a should just be provided two, and it does not need to be disposed so as to sandwich the connection plug 140. Furthermore, although the two first projections 142a and the connection plug 140 are disposed so as to be aligned on a straight line (in a row) in this first embodiment, it does not need to be limited to this. For example, the connection plug 140 may be disposed so as to avoid the straight line passing along the two first projections 142a. However, in either case, it is necessary to match disposal of the connection plug 140 and disposal of the connector 106 with each other and match disposal of the two first projections 142a and disposal of the two third concave portions 102c with each other so that the connection plug 140 can be inserted into the connector 106.

FIG. 6 is an illustration view for explaining a direction that the electronic device 100 is moved when placing the electronic device 100 on the pedestal type device 10. FIG. 7A is a sectional view showing a partial section of a state just before the undersurface of the electronic device 100 is brought into contact with the cover 142 when placing the electronic device 100 on the pedestal type device 10. FIG. 7B is a sectional view showing a partial section of a state where the undersurface of the electronic device 100 is brought into contact with the cover 142 when placing ting the electronic device 100 on the pedestal type device 10. FIG. 7C is a sectional view showing a partial section of a state where the cover 142 is pushed down by the undersurface of the electronic device 100 when placing the electronic device 100 on the pedestal type device 10.

For example, when charging the electronic device 100, in order to place the electronic device 100 on the placement portion 120a of the pedestal type device 10, as shown in FIG. 6, the electronic device 100 is moved toward the first pedestal member 120. In FIG. 6, a moving direction (inserting direction) of the electronic device 100 is shown by an arrow mark, and it is downward, for example. However, the moving direction can also be referred to as a direction the electronic device 100 is placed on the placement portion 120a. If the electronic device 100 is further moved, the convex portion 1200 that is provided in the lower end portion of the rear support portion 120b of the pedestal type device 10 is fitted to the second concave portion 102a that is provided in the lower end portion of the housing 102 of the electronic device 100. That is, a position where the electronic device 100 is to be placed on the pedestal type device 10 is determined. Therefore, each of the second concave portion 102a and the convex portion 1200 can be referred to as a positioning member for determining the position of the electronic device 100 to the pedestal type device 10.

When the convex portion 1200 begins to be fitted into the second concave portion 102a, as shown in FIG. 7A, the hole 102b that is formed in the undersurface of the electronic device 100 faces the connection plug 140 and each of the two third concave portions 102c faces each of the two first projections 142a.

If the electronic device 100 is further moved downward from a state shown in FIG. 7A, as shown in FIG. 7B, each of the two first projections 142a is fitted to corresponding each of the two third concave portions 102c, and the undersurface of the electronic device 100 is brought into contact with the upper surface of the cover 142.

If the electronic device 100 is further moved downward from a state shown in FIG. 7B, as shown in FIG. 7C, the cover 142 is pushed down by the electronic device 100. The two first projections 142a are moved downward in conjunction with the cover 142. That is, since the first projection 142a having an inclined surface is fitted to the third concave portion 102c having an inclined surface in a state where the convex portion 1200 is fitted to the second concave portion 102a, the cover 142 is moved horizontally within the movable range, whereby a gap between the first projection 142a and the third concave portion 102c can be absorbed (compensated).

Therefore, the connector 106 of the electronic device 100 and the connection plug 140 of the pedestal type device 10 are positioned, and the cover 142 is pushed down together with the electronic device 100, whereby the connector 106 and the connection plug 140 can be connected to each other. However, by pushing the cover 142 down, in conjunction with this, the connection plug 140 is exposed gradually. Furthermore, each of the third concave portions 102c and the first projections 142a can be referred to as a positioning member of the connector 106 to the connection plug 140.

Thus, a position that the electronic device 100 is to be placed on the pedestal type device 10 is determined by the second concave portion 102a provided on the housing 102 and the convex portion 1200 provided in the rear support portion 120b of the pedestal type device 10, and subsequently, a position of the connector 106 to the connection plug 140 is determined by the two third concave portions 102c provided in the undersurface of the electronic device 100 and the two first projections 142a provided in the upper surface of the cover 142. That is, the position of the connector 106 to the connection plug 140 is roughly determined by the second concave portion 102a and the convex portion 1200, and then, the position of the connector 106 to the connection plug 140 is determined finely (precisely) by the third concave portions 102c and the first projections 142a. Thus, since high-precision positioning is performed following low-precision positioning, the position of the connector 106 to the connection plug 140 can be determined easily and precisely.

Therefore, when the electronic device 100 is placed on a correct position of the placement portion 120a of the pedestal type device 10 so that the convex portion 1200 is fitted to the second concave portion 102a as shown also in FIG. 7C, the connection plug 140 is inserted into the depths of the connector 106. That is, the connection plug 140 and the connector 106 are fitted (connected) to each other. Therefore, even if an effective fitting length of the connection plug 140 and the connector 106 is comparatively short, the pedestal type device 10 and the electronic device 100 can be electrically connected surely.

If the pedestal type device 10 and the electronic device 100 are electrically connected, charging of the battery built in the electronic device 100 is started. However, when battery residual quantity is 100%, charging is not performed or charge is ended. The pedestal type device 10 and the electronic device 100 are thus configured to be electrically connectable to each other. Therefore, a charging system is constructed by the pedestal type device 10 and the electronic device 100.

Although a case where a center of the hole 102b and a center of the connection plug 140 are aligned on a straight line and a center of the third concave portion 102c and a center of the first projection 142a are aligned on a straight line is shown in FIG. 7A-FIG. 7C, since the width of the second concave portion 102a is made larger than somewhat the width of the convex portion 1200, there is possibility that the center of the hole 102b and the center of the connection plug 140 are slightly shifted from each other and the center of the third concave portion 102c and the center of the first projection 142a are slightly shifted from each other. Even in such a case, the connection plug 140 is moved within the movable range in the horizontal direction according to a movement of the cover 142, and therefore, the first projection 142a having the inclined surface is fitted to the third concave portion 102c having the inclined surface. Therefore, when the convex portion 1200 is fitted to the second concave portion 102a, the first projection 142a is fitted to the third concave portion 102c, and the connection plug 140 is connected to the connector 106.

Although illustration is omitted, when the convex portion 1200 is not fitted to the second concave portion 102a because the positions of the second concave portion 102a and the convex portion 1200 are shifted from each other, the electronic device 100 cannot be placed on the correct position of the placement portion 120a of the pedestal type device 10, and therefore, the undersurface of the electronic device 100 is not brought into contact with the cover 142.

Furthermore, even if the undersurface of the electronic device 100 is brought into contact with the cover 142, the cover 142 is hardly pushed down. This is because the convex portion 1200 is disposed above the first projection 142a (cover 142) as shown also in FIG. 1, FIG. 2A, FIG. 2B, and FIG. 6.

Thus, when the undersurface of the electronic device 100 is not brought into contact with the cover 142, the connection plug 140 is in a state of being still covered with the cover 142 except for its tip end portion. That is, the connection plug 140 is protected by the cover 142. However, when the undersurface of the electronic device 100 is brought into contact with the cover 142 and thus the cover 142 is slightly pushed down, the undersurface of the electronic device 100 may be brought into contact with the connection plug 140. In this case, since the connection plug 140 is supported by the second spring 206, the same is moved downward. Therefore, it is possible to prevent a fault that the connection plug 140 is broken at a connecting portion with the circuit board 210 from occurring.

However, as described above, when the electronic device 100 is placed on the correct position of the placement portion 120a of the pedestal type device 10, since the connection plug 140 needs to be inserted into the connector 106, a spring load of the second spring 206 (compression spring) is set as a value larger than a maximum insertion force (7 (N), for example) of the connector 106.

Furthermore, since the pedestal type device 10 and the electronic device 100 are connected to each other in a communicable manner by the connection plug 140 and the connector 106, it is possible to transmit an image or video drawn (reproduced) by the electronic device 100 to the pedestal type device 10, for example. As described above, since the pedestal type device 10 is connectable to a television receiver, the image or video drawn (reproduced) by the electronic device 100 can be output to the television receiver via the pedestal type device 10. Furthermore, a sound reproduced by the electronic device 100 can also be transmitted to the pedestal type device 10.

Although illustration is omitted, the pedestal type device 10 is connected to a television receiver using an interface and cable of a form such as DisplayPort, HDMI (registered trademark) DVI, D-SUB, etc.

Therefore, when the electronic device 100 is a game machine, it is possible to play, while charging, a game so that a game screen is displayed on a monitor of the television receiver and a sound is output from a speaker of the television receiver. Furthermore, if the electronic device 100 is a tablet PC, it is possible to perform, while charging, an application that can be performed by the tablet PC concerned so that an execution screen is displayed on a monitor of the television receiver and a sound accompanying the execution of application is output from a speaker if needed. Although a description is omitted, this is the same to other kinds of electronic device 100.

Furthermore, when the electronic device 100 is removed (separated) from the pedestal type device 10 after the charging of the battery built in the electronic device 100 is ended, a user lifts the electronic device 100, for example. At this time, since the pedestal type device 10 is in a state where it is put on an arbitrary location, such as a television stand, a desk or the like, in order to separate (remove) the connection plug 140 from the connector 106, even if the electronic device 100 is lifted, the pedestal type device 10 should not follow it.

Therefore, in this first embodiment, in order to make the pedestal type device 10 not follow the electronic device 100 and thus to separate the connection plug 140 from the connector 106 even if the electronic device 100 is lifted, a lower limit of the spring load of the first spring 204 (extension spring) is determined according to a formula 1. Here, a spring load is F (N), a weight of the pedestal type device 10 is M (kg), a maximum removal force of the connector 106 is f (N), and a gravitational acceleration is g (m/s$^2$). For example, the maximum removal force f is 3 (N) and the gravitational acceleration is 9.8 (m/s$^2$). In addition, each physical quantity is represented with the SI system of units.

$$F > f - Mg \quad \text{[Formula 1]}$$

However, if the spring load F (N) is made too large, there may occur that the electronic device 100 is pushed up by a restoring force of the first spring 204, and therefore, a fitting state (connection state) of the connection plug 140 and the connector 106 is released. In order to avoid such inconvenience, an upper limit of the spring load F (N) of the first spring 204 is determined according to a formula 2. Here, a weight of the electronic device 100 is m (kg).

$$F < mg + f \quad \text{[Formula 2]}$$

The spring load F (N) is thus set up within a range of the upper limit and the lower limit according to the formula 1 and the formula 2. Therefore, when the electronic device 100 is placed on the placement portion 120a of the pedestal type device 10, a fitting state of the connection plug 140 and the connector 106 is maintained, and accordingly, when removing (lifting) the electronic device 100 from the pedestal type device 10, the connection plug 140 can be surely separated from the connector 106 without pressing down the pedestal type device 10.

According to this first embodiment, a position of the electronic device to pedestal type device is determined by the second concave portion provided in the rear surface of the electronic device and the convex portion provided in the rear support portion of the pedestal type device, and a position of the connector to the connection plug is determined by the two third concave portions provided in the undersurface of the electronic device and the two first projections provided in the upper surface of the cover of the pedestal type device, and therefore, even if the connection portion of the connection plug and the connector is invisible, by shifting the position of the electronic device so that the convex portion may be fitted to the second concave portion, it is possible to place the electronic device on a correct position of the placement portion of the pedestal type device. That is, even if it is impossible to see the connection portion of the connection plug and the connector, the connection plug can be inserted into the connector surely.

Furthermore, according to this first embodiment, since the connection plug is inserted to the depths of the connector when the electronic device is placed on the correct position of the placement portion of pedestal type device, even if the effective fitting length of the connection plug and the connector is comparatively short, the pedestal type device and the electronic device are electrically connected to each other surely.

Moreover, according to this first embodiment, since the connection plug is supported by means of the spring, the connection plug is movable in a vertical direction, and movable also in the horizontal direction according to the movement of the cover in the horizontal direction. Therefore, the connection plug is moved downward when the connector is brought into contact with the tip end of the connection plug, or the connection plug follows the movement of the cover in the horizontal direction when connecting it to the connector, and therefore, when placing the electronic device on the placement portion of the pedestal type device, while being able to reduce damage by collision as much as possible, the connection plug can follow a motion of the electronic device.

Moreover, according to this first embodiment, since the cover is supported by means of the spring, when the electronic device is placed on the placement portion of the pedestal type device, it is possible to move the cover in the horizontal direction according to the position of the electronic device. Furthermore, by setting the spring load of the spring that supports the cover to an appropriate value, the fitting state of the connection plug and the connector cannot be released when the electronic device is being placed on the pedestal, and when lifting the electronic device from the pedestal type device, the pedestal type device does not follow the electronic device, and thus, it is possible to separate the connection plug from the connector.

In addition, although the convex portion is provided in the center of the lower end portion of the rear support portion of the pedestal type device and the second concave portion is provided in the center of the lower end portion of the rear surface of the electronic device in the first embodiment, as long as the connection plug can be inserted in the connector, these positions may be set in positions other than the center. Furthermore, the numbers of the convex portions and the second concave portions may be two or more, respectively. Moreover, the convex portion may be provided in a side of the electronic device, and the second concave portion may be provided in a side of the pedestal type device. However, if there is no gap between the electronic device and the rear support portion, or when there is almost nothing, it is necessary to form the second concave portion from the lower end of the rear support portion to the upper end.

Second Embodiment

Since a pedestal type device 10 of the second embodiment is the same as the pedestal type device 10 of the first embodiment except that the electronic device 100 is made to be able to be placed even if a front side and a rear side thereof are reversed, a duplicate description will be omitted, or described briefly. Furthermore, in the drawing, the same reference numerals will be applied to portions common to those of the first embodiment.

The connection plug 140 shown in the first embodiment can be used in both front and rear. That is, the connection plug 140 can be inserted into the connector 106 without caring front or rear. As described above, in the second embodiment, in order to make the electronic device 100 be able to be placed even if the front side and the rear side are reversed, the second concave portion 102a that is provided in the rear surface of the electronic device 100 shown in the first embodiment is eliminated and the convex portion 1200 that is provided in the pedestal type device 10 shown in the first embodiment is eliminated. With this change, a part of form of the cover 142 and its mounting structure 200 of the first embodiment are changed.

FIG. 8 is a sectional view viewing a section of the pedestal type device 10 in the second embodiment from the front. FIG. 9 is a perspective view viewing the mounting structure 300 of the cover 342 in the second embodiment from obliquely above.

As shown in FIG. 8 and FIG. 9, the mounting structure 300 includes a fourth pedestal member 302. The fourth pedestal member 302 is constituted by two support portions 302a and two fourth attaching portions 302b. If viewing a section of the support portion 302a from the front, the support portion 302a has a portion that is formed in a concave portion, and the fourth attaching portion 302b is provided in a bottom of the concave portion.

The support portion 302a is protruded out of the concave portion in one upper end portion of the concave portion, and has an engaging portion that regulates a upward movement of a fifth pedestal member 308. Furthermore, the support portion 302a has a plate-like portion that is extended out of the concave portion in the horizontal direction in the other upper end portion of the concave portion.

Although illustration is omitted, the fourth attaching portion 302b has a screw hole that a spiral slot is formed in an inside thereof. However, in a position where the fourth attaching portion 302b is provided, the support portion 302a is also penetrated, and therefore, a screw hole of the fourth attaching portion 302b is communicated to an undersurface of the fourth pedestal member 302. Furthermore, in the placement portion 120a, a bottom of a position corresponding to the position where the fourth attaching portion 302b is provided is penetrated. Therefore, the fourth pedestal member 302 is fixed with a screw from the undersurface of the placement portion 120a.

Furthermore, one end of a third spring 304 is mounted to the fourth attaching portion 302b. The other end of the third spring 304 is attached to a fifth attaching portion 310b that is provided in an undersurface of a first lock member 310. That is, the first lock member 310 is supported by means of the third spring 304 from below, and can be displaced in an up-and-down direction.

However, the fifth pedestal member 308 is equivalent to one that the support portions of both ends are eliminated from the third pedestal member 208 shown in the first embodiment. Therefore, in the second embodiment, the fifth pedestal member 308 is sandwiched by the two support portions 302a. Furthermore, in the second embodiment, likewise the first embodiment, the circuit board 210 is attached to the fifth pedestal member 308, and further, the connection plug 140 is mounted on the upper surface of the circuit board 210.

Furthermore, in the second embodiment, a sixth attaching portion 308a is formed in an undersurface of the fifth pedestal member 308, to which one end of a fourth spring 306 is attached. The other end of the fourth spring 306 is fitted (held) to a fourth concave portion 1222 that is formed in a bottom of an inside of the placement portion 120a. Therefore, the fifth pedestal member 308 is supported by means of the fourth spring 306 so as to be movable in the up-and-down direction at least. However, since the fourth spring 306 can be not only expanded/contracted but bent, the fifth pedestal member 308 is movable in the horizontal direction. Therefore, the circuit board 210 and the connection plug 140 are also movable in the up-and-down direction and the horizontal direction.

Furthermore, a depression portion 310a of a shape of quadrangular prism is provided on an upper surface of a first lock member 310 and above the fifth attaching portion 310b. This depression portion 310a is disposed between a third projection 342a that is formed on the upper surface of the cover 342 and a fourth hole 342b through which the connection plug 140 is passed, and an inside of a fifth hole 342c that is provided near the third projection 342a. Furthermore, this depression portion 310a is set in a height as the same as that of the third projection 342a or lower than the third projection 342a before the electronic device 100 is placed on the placement portion 120a.

Moreover, an engaging portion 310c that is formed in a L-letter shape in section is provided in the first lock member 310. The engaging portion 310c is protruded toward the cover 342, and inclined so as to rise in that protruded portion as a lower end surface opposite to an upper end surface that is engaged (brought into contact) with the cover 342 goes toward a side surface of the cover 342. That is, an inclined surface is formed in the undersurface (side surface) of the engaging portion 310c.

Between a ceiling of the placement portion 120a and a plate-like portion of the support portion 302a, a second lock member 312 and a fifth spring 314 are provided. The second lock member 312 is formed in a shape of rod. In this second embodiment, one end portion of the second lock member 312 is fitted to a portion of a notch 342d that is formed in a lower end portion on the left (or right) of the cover 342, thereby to regulate a downward movement of the cover 342. That is, the cover 342 is locked. Furthermore, the other end portion of the second lock member 312 is formed more thinly than the one end portion, to which one end of the fifth spring 314 is attached. The other end portion of the fifth spring 314 is brought into contact with a wall 1206 that is extended downward from the ceiling of the placement portion 120a. Therefore, the second lock member 312 is provided movably in a longitudinal direction thereof (left-right direction).

Furthermore, the cover 342 is provided with a fourth projection 342e that is protruded out of the cover 342 in a horizontal direction in a lower end portion of the side surface in a portion where the notch 342d is not formed. This fourth projection 342e is provided in order to regulate an upward movement of the cover 342 while being engaged with a rear side surface (ceiling) of the upper surface of the placement portion 120a.

FIG. 10A is a sectional view showing a partial section of a state where the undersurface of the electronic device 100 is brought into contact with the depression portion 310a of the first lock member 310 when placing the electronic device 100 on the pedestal type device 10. FIG. 10B is a sectional view showing the partial section of a state where the undersurface of the electronic device 100 is brought into contact with the cover 342 when placing the electronic device 100 on the pedestal type device 10. FIG. 10C is a sectional view showing the partial section in the state where the cover 342 is pushed down by the undersurface of the electronic device 100 when placing the electronic device 100 on the pedestal type device 10.

In also the second embodiment, as shown in FIG. 6, when the electronic device 100 is moved in the moving direction and the position of the electronic device 100 to the pedestal type device 10 is correct, as shown in FIG. 10A, the undersurface of the electronic device 100 is brought into contact with (abutted on) the upper surface of the depression portion 310a of the first lock member 310. At this time, as shown in FIG. 10A, the hole 102b formed in the undersurface of the electronic device 100 faces the connection plug 140, and each of the two third concave portions 102c faces each of the two third projections 342a formed in the upper surface of the cover 342.

If the electronic device 100 is further moved downward from a state shown in FIG. 10A, as shown in FIG. 10B, the first lock member 310 is pushed down. Then, due to the inclined surface of the first lock member 310, the second lock member 312 is moved toward the end portion of the left or the right away from the center of the pedestal type device 10. Therefore, the lock of the cover 342 is released. Accordingly, each of the two third projections 342a is fitted to corresponding each of the two third concave portions 102c, and the undersurface of the electronic device 100 is brought into contact with the upper surface of the cover 342. In the second embodiment, when the lock is released, each of the two third projections 342a is fitted to corresponding each of the two third concave portions 102c.

If the electronic device 100 is further moved downward from a state shown in FIG. 10B, as shown in FIG. 10C, the cover 342 is pushed down by the electronic device 100. Likewise the first embodiment, the two third projections 342a are moved downward in conjunction with the cover 342. That is, when the third projections 342a are fitted to the third concave portions 102c, the connector 106 of the electronic device 100 and the connection plug 140 of the pedestal type device 10 are positioned, and the cover 342 is pushed down together with the electronic device 100. Therefore, the connection plug 140 is connected to the connector 106. However, in also the second embodiment, likewise the first embodiment, if the cover 342 is pushed down, in conjunction with this, the connection plug 140 is gradually exposed.

Thus, in the second embodiment, a position of the electronic device 100 to the pedestal type device 10 is determined by matching the position thereof to a position capable of releasing the lock, and a position of the connector 106 to the connection plug 140 is determined by the two third concave portions 102c provided in the undersurface of the electronic device 100 and the two third projections 342a provided in the upper surface of the cover 342. Therefore, as shown also in FIG. 10C, when the electronic device 100 is placed on the correct position of the placement portion 120a of the pedestal type device 10, the connection plug 140 is inserted to the depths of the connector 106.

Although illustration is omitted, since the electronic device 100 is not placed on the correct position of the placement portion 120a of the pedestal type device 10 when the electronic device 100 is shifted from the position capable of releasing the lock, the undersurface of the electronic device 100 is not brought into contact with the cover 342 and the depression portion 310a of the first lock member 310. Otherwise, even if the undersurface of the electronic device 100 is brought into contact with the first lock member 310, the first lock member 310 is hardly pushed down.

In such a case, since the lock of the cover 342 is not released, likewise the first embodiment, the connection plug 140 is in a state still covered with the cover 342 except for the tip end portion thereof. However, when the lock of the cover 342 is released and the cover 342 is slightly pushed down, the undersurface of the electronic device 100 may be brought into contact with the connection plug 140. In this case, since the connection plug 140 is supported by the fourth spring 306, it is moved downward. Therefore, it is possible to prevent a fault that the connection plug 140 is broken at a connecting portion with the circuit board 210 from occurring.

Furthermore, although detailed description is omitted, also in the second embodiment, likewise the first embodiment, a spring load F of the third spring 304 is appropriately set up according to the formula 1 and the formula 2. Furthermore, a spring load of the fourth spring 306 (compression spring) is also set up, likewise the first embodiment, to a value larger than a maximum insertion force (7(N), for example) of the connector 106.

Moreover, in the second embodiment, when removing (lifting) the electronic device 100 from the pedestal type device 10, according to a movement of the electronic device 100 upward, the first lock member 310 and the cover 342 are also moved upward. As shown in FIG. 10A-FIG. 10C, in the second lock member 312, the lower end surface is inclined in the end portion of the first lock member 310 so as to rise as the lower end surface goes toward the side surface of the first lock member 310. That is, an inclined surface is formed in the undersurface (side surface) of the second lock member 312. Therefore, since the upper end portion of the engaging portion 310c is moved along the inclined surface of the second lock member 312 when the first lock member 310 rises, the engaging portion 310c is not engaged with the second lock member 312. Therefore, if the electronic device 100 is removed from the pedestal type device 10, the first lock member 310 and the second lock member 312 return to their original positions together with the cover 342.

According to the second embodiment, since a lock mechanism for locking the cover is provided in the mounting structure, even if the convex portion 1200 and the second concave portion 102a shown in the first embodiment are not provided, it is possible to obtain, by this lock mechanism, the same effect as a case where the electronic device 100 to the pedestal type device 10 is positioned by the convex portion 1200 and the second concave portion 102a. Therefore, in also the second embodiment, the same effect as the first embodiment can be expected.

In addition, in the second embodiment, in order to make the electronic device 100 be able to be placed on the placement portion 120a of the pedestal type device 10 even if the front side and the rear side are reversed, the rear support portion 120b is not provided with the convex portion 1200 and the rear surface of the electronic device 100 is not provided with the second concave portion 102a; however, the convex portion 1200 and the second concave portion 102a may be provided likewise the first embodiment and thus the electronic device 100 may be made to be able to be placed on the pedestal type device 10 in a state where the electronic device 100 is oriented to one direction. In this case, it is thinkable that it is possible to easily lead the position of the electronic device to the position capable of releasing the lock by the convex portion 1200 and the second concave portion 102a.

Furthermore, although a case where the size of the front of the electronic device is almost the same as that of the front of the rear support portion of pedestal type device is described in each above-described embodiment, it does not need to be limited to this. For example, the size of the front of the electronic device may be smaller than the size of the front of the rear support portion of pedestal type device. Furthermore, since the left and right side surfaces and the upper surface of the first pedestal member are opened in the pedestal type device of the above-described embodiments when viewing it from the front, the size of the front of the electronic device may be larger than the size of the front of rear support portion. However, in either case, the electronic device needs to have the second concave portion to which the convex portion provided in the rear support portion of the pedestal type device is fitted and to have the hole that the connector is disposed between the two third concave portions to which the projections provided on the cover of the pedestal type device are fitted in a plane that is adjacent to a surface on which the second concave portion is provided and orthogonally intersecting or substantively orthogonally intersecting the surface concerned. Therefore, by the pedestal type device of the embodiments, it is possible to charge electronic device that is of the same kind but has different size of the display (main body), and to perform data communication. Furthermore, depending on the positions of the second concave portion and the third concave portion, the electronic device can be made to be a vertically placed type rather than a horizontally placed type as in the above-described embodiments.

Moreover, although each of the cover and the connection plug is supported using the spring that is an example of an elastic body in the above-described embodiments, at least one of the cover and the connection plug may be supported using rubber.

Furthermore, in each of the above-described embodiments, in order to make possible to visually recognize the front (front surface) of the electronic device, i.e., the display of the electronic device, and to support the electronic device from the front, the front support member except for the projection portions is set to a height comparable as the upper surface (except for the projections) of the cover. Therefore, it is also possible to place the electronic device on the placement portion of the pedestal type device while seeing the connection portion of the connection plug and the connector. However, this is an example, and as shown in FIG. 11, the front support member may be formed in a shape of rectangular plate so that an upper end thereof may become the same height or almost the same height as the upper surface of the rear support portion (accommodation member). Otherwise, it is possible to make a plate-like cover having a planer shape at the time of viewing the pedestal type device from the front be attachable to the front surface of the front support member.

When doing in this way, it is impossible to see the connection portion of the connection plug and the connector, or it is very difficult to see it. However, in the first embodiment, if the convex portion of the rear support portion of the pedestal type device is fitted to the second concave portion of the rear surface of the electronic device, the two third projections of the cover of the pedestal type device are fitted to the two third concave portions in the undersurface of the electronic device, whereby the connection plug can be inserted to the connector. Furthermore, in the second embodiment, if matching the position of the electronic device to the position capable of releasing the lock, the lock of the cover is released while the two third projections of the cover of the pedestal type device are fitted to the two third concave portions in the undersurface of the electronic device, whereby the connection plug can be inserted to the connector. That is, even if the connection portion is invisible, it is possible to position the electronic device to the pedestal type device thereby inserting the connection plug to the connector easily. Furthermore, before positioning the electronic device to the pedestal type device, since the connection plug is protected by the cover and is movable in the vertical direction, it is possible to prevent a fault that the connection plug is broken at the connecting portion with the circuit board from occurring.

In an aspect, an embodiment is a charger that charges an electronic device that has a first connection terminal and is placed on a placement portion of the charger, comprising: a second connection terminal configured to be electrically connected to the first connection terminal of the electronic device; and a spring that supports the second connection terminal movably in a direction that the electronic device is attached or detached, wherein a spring load of the spring is larger than a difference obtained by subtracting a weight of the charger from a maximum value of a removal force in removing the first connection terminal from the second connection terminal.

According to this embodiment, since the spring load of the spring supporting the second connection terminal is set larger than the difference obtained by subtracting the weight of the charger from the maximum value of the removal force in removing the first connection terminal from the second connection terminal, it is possible to release the connection of the first connection terminal and the second connection terminal by lifting the electronic device while still putting the charger, without making the charger follow the electronic device.

In another aspect, an embodiment is a charger that charges an electronic device that has a first connection terminal and is placed on a placement portion of the charger, comprising: a second connection terminal configured to be electrically connected to the first connection terminal of the electronic device; and a spring that supports the second connection terminal movably in a direction that the electronic device is attached or detached, wherein a spring load of the spring is larger than a maximum value of an insertion force in inserting the second connection terminal to the first connection terminal.

According to this embodiment, since the spring load of the spring supporting the second connection terminal is set larger than the maximum value of the insertion force in inserting the second connection terminal into the first connection terminal, it is possible to insert the second connection terminal to the depths of the first connection terminal by only placing the electronic device on the placement portion of the charger.

In another aspect, an embodiment is a charger that charges an electronic device that has a first connection terminal and is placed on a placement portion of the charger, comprising: a second connection terminal configured to be electrically connected to the first connection terminal of the electronic device; a first movable member that surrounds the second connection terminal and is movable in a direction that the electronic device is attached or detached; a second movable member that is moved, when placing the electronic device, in a placing direction of the electronic device; and a third movable member that regulates a movement of the first movable member toward the placing direction when the second movable member is not moved, and is moved, when the second movable member is moved, in a direction perpendicular to the placing direction according to a movement of the second movable member so as to release regulation to the movement of the first movable member in the placing direction.

According to this embodiment, at the time that the electronic device is place, if the second movable member is moved in the placing direction of the electronic device, the third movable member is moved according to this movement, whereby a state where the movement in the placing direction of the first movable member is regulated to a state where the regulation is released. That is, it is possible to provide a lock mechanism that makes the first movable member in a movable state in the placing direction of the electronic device only when the second movable member is moved in the placing direction.

In a further embodiment, the charger further comprises a second fitting portion configured to be fitted to a first fitting portion in the electronic device. The second movable member is configured to move according to the movement of the electronic device, when the first fitting portion is fitted to the second fitting portion.

According to this embodiment, by only fitting the first fitting portion and the second fitting portion to each other, the lock can be released.

In another embodiment, the charger further comprises a fourth fitting portion configured to be fitted to a third fitting portion in the same plane of the electronic device as a plane that the first connection terminal is provided. The first movable member is configured to move in the placing direction of the electronic device when the third fitting portion is fitted to the fourth fitting portion.

According to this embodiment, if it is constituted so that the first connection terminal and the second connection terminal face each other when the third fitting portion and the fourth fitting portion are fitted to each other, when the third fitting portion and the fourth fitting portion are fitted to each other, the lock is released and the position of the second connection terminal to the first connection terminal can be determined.

Although certain example systems, devices and apparatuses have been described herein, it is to be understood that the appended claims are not to be limited to the systems, devices and apparatuses disclosed, but on the contrary, are intended to cover various modifications and equivalent arrangements included within the spirit and scope of the appended claims.

What is claimed is:

1. A charger that charges an electronic device that includes a female electrical connector including a first electrical contact, a first fitting portion offset from a first surface, and a second fitting portion offset from a second surface different from the first surface, the charger comprising:
    a third fitting portion configured to fit within the first fitting portion, the third fitting portion being non-conductive;
    a fourth fitting portion configured to fit within the second fitting portion, the fourth fitting portion being non-conductive;
    a male electrical connector including a second electrical contact configured to be inserted into the female electrical connector of the electronic device to electrically connect the first electrical contact and the second electrical contact; and
    a placement portion that includes the third fitting portion, the fourth fitting portion and the male electrical connector, and the placement portion is configured to receive the electronic device and hold the electronic device in a predetermined orientation, wherein
    the female electrical connector and the male electrical connector are configured to engage in an engaging direction;
    the third fitting portion is configured to partially fit within the first fitting portion to align the male electrical connector with the female electrical connector such that when the charger and the electronic device are moved towards each other along the engaging direction, the third fitting portion partially fits inside of the first fitting portion before the male electrical connector is inserted into the female electrical connector; and
    the fourth fitting portion and the male electrical connector are exposed from the placement portion such that when the charger and the electronic device are fully engaged, the male electrical connector and the fourth fitting portion extend into the electronic device and the male electrical connector extends farther into the electronic device than the fourth fitting portion.

2. The charger of claim 1, wherein the fourth fitting portion is a projection and the second fitting portion is a recess configured to receive the projection.

3. The charger of claim 1, wherein the fourth fitting portion includes two projections and the second fitting portion includes two recesses configured to receive the two projections.

4. The charger of claim 3, wherein the male electrical connector is between the two projections.

5. The charger of claim 3, wherein the male electrical connector is centered between the two projections.

6. The charger of claim 1, further comprising a support surface configured to support a rear side of the electronic device while the electronic device is received in the placement portion.

7. The charger of claim 6, wherein the third fitting portion is a protrusion protruding away from the support surface and the first fitting portion is a recess configured to receive the protrusion.

8. The charger of claim 1, further comprising a support surface configured to support the first surface of the electronic device while the electronic device is received in the placement portion.

9. The charger of claim 1, further comprising a support surface configured to support a rear side of the electronic device while the electronic device is received in the placement portion, and the engaging direction is parallel to the support surface.

10. The charger of claim 1, wherein the first surface intersects the second surface orthogonally or substantially orthogonally.

11. The charger of claim 1, wherein the third fitting portion is configured to control a position of the electronic device relative to the placement portion, and the fourth fitting portion is configured to control a position of the female electrical connector relative to the male electrical connector.

12. The charger of claim 1, wherein the second fitting portion and the fourth fitting portion are configured to engage in the engaging direction, and the fourth fitting portion includes a projection having an inclined surface that is inclined to the engaging direction.

13. The charger of claim 1, wherein the fourth fitting portion includes a projection in a shape of cone or truncated cone.

14. The charger of claim 1, wherein the engaging direction is linear.

15. The charger of claim 1, wherein the third fitting portion roughly aligns the female electrical connector with the male electrical connector and the fourth fitting portion aligns the female electrical connector with the male electrical connector more precisely than the third fitting portion.

16. The charger of claim 1, wherein the third fitting portion is configured to limit movement of the electronic device relative to the charger in a direction that is perpendicular to the engaging direction, when the third fitting portion partially fits inside of the first fitting portion.

17. The charger of claim 1, wherein the third fitting portion extends from the placement portion farther than the male electrical connector in a direction that is parallel to the engaging direction.

18. A charger that charges an electronic device that includes a female electrical connector including a first electrical contact, a first recess on a first surface, and a second recess on a second surface different from the first surface, the charger comprising:
    a first protrusion shaped to be received within the first recess, the first protrusion being non-conductive;
    a second protrusion shaped to be received within the second recess, the second protrusion being non-conductive;
    a male electrical connector including a second electrical contact and configured to be inserted into the female electrical connector of the electronic device to electrically connect the first electrical contact and the second electrical contact; and a placement portion that includes the first protrusion, the second protrusion and the male electrical connector, and the placement portion is configured to receive the electronic device and hold the electronic device in a predetermined orientation, wherein the first protrusion is configured to partially fit inside of the first recess to align the male electrical connector with the female electrical connector such that when the charger and the electronic device are moved towards each other, the first protrusion partially fits inside of the first recess before the male electrical connector is inserted into the female electrical connector; and wherein the second protrusion and the male electrical connector are exposed from the placement portion such that when the charger and the electronic device are fully engaged, the male electrical connector and the second protrusion extend into the electronic device and the male electrical connector extends farther into the electronic device than the second protrusion.

19. The charger of claim 18, further comprising a third protrusion with the same shape as the second protrusion and shaped to be received in a third recess on the second surface of the electronic device.

20. The charger of claim 19, wherein the male electrical connector is between the second protrusion and the third protrusion.

21. The charger of claim 19, wherein the male electrical connector is centered between the second protrusion and the third protrusion.

22. The charger of claim 18, further comprising a support surface configured to support a rear side of the electronic device while the electronic device is received in the placement portion.

23. The charger of claim 22, wherein the first protrusion protrudes away from the support surface.

24. The charger of claim 18, wherein the female electrical connector and the male electrical connector are configured to engage in an engaging direction; and the first protrusion is configured to be partially received within the first recess due to movement of the charger and the electronic device towards each other along the engaging direction before the female electrical connector and the male electrical connector are engaged.

25. The charger of claim 24, further comprising a support surface configured to support a rear side of the electronic device while the electronic device is received in the placement portion, and the engaging direction is parallel to the support surface.

26. The charger of claim 18, wherein the first surface intersects the second surface orthogonally or substantially orthogonally.

27. The charger of claim 18, wherein the first protrusion is configured to control a position of the electronic device relative to the placement portion, and the second protrusion is configured to control a position of the female electrical connector relative to the male electrical connector.

28. The charger of claim 18, wherein the second recess and the second protrusion are configured to engage in an engaging direction, and the second protrusion has an inclined surface that is inclined to the engaging direction.

29. The charger of claim 28, wherein the second protrusion includes a cone or truncated cone.

30. The charger of claim 18, wherein the female electrical connector and the male electrical connector are configured to engage in an engaging direction; and the second protrusion is configured to partially engage with the second recess due to movement of the charger and the electronic device towards each other along the engaging direction before the female electrical connector and the male electrical connector are completely engaged.

31. The charger of claim 18, wherein the first protrusion and the second protrusion have different fitting precisions.

32. The charger of claim 18, wherein the first protrusion is configured to limit lateral movement of the electronic device relative to the charger, when the first protrusion partially fits inside of the first recess.

33. The charger of claim 18, wherein the first protrusion extends from the placement portion farther than the male electrical connector in a longitudinal direction of the first protrusion and the male electrical connector.

* * * * *